(12) United States Patent
Hoehnen et al.

(10) Patent No.: US 11,645,623 B1
(45) Date of Patent: *May 9, 2023

(54) RESOURCE MANAGEMENT SYSTEM

(71) Applicant: PROGRESSIVE CASUALTY INSURANCE COMPANY, Mayfield Village, OH (US)

(72) Inventors: Jason Hoehnen, Mayfield Village, OH (US); Sara Edwards, Mayfield Village, OH (US); Hassan Al Rawi, Mayfield Village, OH (US); Sharon Parks, Mayfield Village, OH (US); Dominic Valentino, Mayfield Village, OH (US); Allen Layne, Mayfield Village, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/232,339

(22) Filed: Apr. 16, 2021

Related U.S. Application Data

(63) Continuation of application No. 16/998,614, filed on Aug. 20, 2020, now Pat. No. 10,997,559.

(51) Int. Cl.
    *G06F 21/00* (2013.01)
    *G06Q 10/10* (2023.01)
    (Continued)

(52) U.S. Cl.
    CPC .......... *G06Q 10/103* (2013.01); *G06F 9/547* (2013.01); *G06F 16/242* (2019.01); *G06Q 20/085* (2013.01); *G06Q 30/0185* (2013.01); *G06Q 30/0611* (2013.01); *G06Q 30/0631* (2013.01); *H04L 9/085* (2013.01); *H04L 9/0894* (2013.01); *H04L 63/08* (2013.01); *H04L 63/102* (2013.01); *H04L 67/52* (2022.05);
    (Continued)

(58) Field of Classification Search
    CPC ....... H04L 63/08; H04L 63/102; H04L 9/085; H04L 9/0894; G06F 16/242
    USPC .......................................................... 726/26
    See application file for complete search history.

(56) References Cited

U.S. PATENT DOCUMENTS

| 6,567,784 B2 | 5/2003 | Bukow |
| 6,829,584 B2 | 12/2004 | Loveland |

(Continued)

*Primary Examiner* — Longbit Chai
(74) *Attorney, Agent, or Firm* — Lempia Summerfield Katz LLC

(57) ABSTRACT

A system automatically manages remote and local data through a declarative client that retrieves, tracks, and caches data in response to a transmission from an interface. The declarative client sits on an immutable image served by a secure private cloud platform. A serverless compute engine receives the immutable image and a plurality of tasks that process the immutable image in a container. An application programming interface in communication with the declarative client extracts data via queries from a database. The declarative client includes a normalized in-memory cache that breaks up results of the queries into individual objects that are each associated with a unique identifier and a unique name. The extracted data is deconstructed downloaded content in which original computer assigned links between data elements are intercepted and mapped to redirected computer-generated local links that locate the downloaded content in a local database.

20 Claims, 19 Drawing Sheets

(51) Int. Cl.
G06F 16/242 (2019.01)
H04L 9/40 (2022.01)
H04L 9/08 (2006.01)
G06Q 20/08 (2012.01)
G06Q 30/0601 (2023.01)
G06Q 30/018 (2023.01)
G06F 9/54 (2006.01)
H04L 67/52 (2022.01)
H04W 4/12 (2009.01)
G06Q 10/1093 (2023.01)
G06Q 40/12 (2023.01)
G06Q 10/20 (2023.01)

(52) U.S. Cl.
CPC ......... *G06Q 10/1093* (2013.01); *G06Q 10/20* (2013.01); *G06Q 40/12* (2013.12); *G06Q 2220/00* (2013.01); *H04W 4/12* (2013.01)

(56) References Cited

U.S. PATENT DOCUMENTS

| | | | |
|---|---|---|---|
| 7,058,508 | B2 | 6/2006 | Combs et al. |
| 7,096,193 | B1 | 8/2006 | Beaudoin et al. |
| 7,487,111 | B2 | 2/2009 | Shoen et al. |
| 7,516,103 | B1 | 4/2009 | Peitrucha, Jr. et al. |
| 7,707,055 | B2 | 4/2010 | Behmoiras et al. |
| 7,774,223 | B2 | 8/2010 | Karabetsos |
| 7,835,928 | B2 | 11/2010 | Schoenberg |
| 7,881,977 | B2 | 2/2011 | Walker |
| 7,912,744 | B2 | 3/2011 | Combs et al. |
| 7,958,042 | B2 | 6/2011 | Burns et al. |
| 7,983,968 | B1 | 7/2011 | Chase et al. |
| 8,010,430 | B1 | 8/2011 | Chase et al. |
| 8,024,261 | B2 | 9/2011 | Erbey et al. |
| 8,036,160 | B1 | 10/2011 | Oakes, III |
| 8,046,263 | B1 | 10/2011 | Linn |
| 8,135,627 | B2 | 3/2012 | Shoen et al. |
| 8,190,732 | B1 | 5/2012 | Cooley et al. |
| 8,271,326 | B1 | 9/2012 | Brunet et al. |
| 8,290,801 | B1 | 10/2012 | Roach, Jr. et al. |
| 8,301,478 | B2 | 10/2012 | Agrawal |
| 8,346,582 | B1 | 1/2013 | Davis et al. |
| 8,346,624 | B2 | 1/2013 | Goad et al. |
| 8,370,235 | B1 | 2/2013 | Chase et al. |
| 8,412,618 | B2 | 4/2013 | Robertson et al. |
| 8,433,617 | B2 | 4/2013 | Goad et al. |
| 8,478,659 | B2 | 7/2013 | Behmoiras et al. |
| 8,533,019 | B2 | 9/2013 | Agrawal |
| 8,612,262 | B1 | 12/2013 | Condon et al. |
| 8,738,727 | B2 | 5/2014 | Schoenberg |
| 8,825,736 | B2 | 9/2014 | Agrawal |
| 8,838,504 | B2 | 9/2014 | Eraker et al. |
| 8,838,751 | B1 | 9/2014 | Scofield et al. |
| 9,129,326 | B2 | 9/2015 | Agrawal |
| 9,349,121 | B2 | 5/2016 | Green |
| 9,400,845 | B2 | 7/2016 | Damelia |
| 9,426,293 | B1 | 8/2016 | Oakes, III |
| 9,436,945 | B2 | 9/2016 | Eraker et al. |
| 9,449,040 | B2 ‡ | 9/2016 | Gupta ................. G06F 11/1446 |
| 9,800,676 | B2 | 10/2017 | Lee |
| 9,852,447 | B2 | 12/2017 | Eraker et al. |
| 9,970,675 | B2 | 5/2018 | Quam et al. |
| 10,002,398 | B2 | 6/2018 | Isaacson |
| 10,007,942 | B2 | 6/2018 | Wickam |
| 10,042,341 | B1 | 8/2018 | Jacob |
| 10,043,206 | B2 | 8/2018 | Zamer et al. |
| 10,083,411 | B2 | 9/2018 | Kinsey, II et al. |
| 10,116,755 | B2 | 10/2018 | Kim et al. |
| 10,122,671 | B2 | 11/2018 | Donahoe et al. |
| 10,157,412 | B2 | 12/2018 | Tolia et al. |
| 10,171,670 | B1 | 1/2019 | Oakes |
| 10,262,375 | B1 | 4/2019 | Howard |
| 10,334,077 | B2 | 6/2019 | Loynd et al. |
| 10,402,760 | B2 | 9/2019 | Kinsey, II |
| 10,489,745 | B1 | 11/2019 | Verroios et al. |
| 2009/0192854 | A1 | 7/2009 | Pietrucha, Jr. et al. |
| 2015/0001930 | A1 | 1/2015 | Juntunen et al. |
| 2015/0127174 | A1 | 5/2015 | Quam et al. |
| 2016/0164310 | A1 | 6/2016 | Juntunen et al. |
| 2018/0003744 | A1 | 1/2018 | Juntunen et al. |
| 2018/0225713 | A1 | 8/2018 | Eraker et al. |
| 2019/0066840 | A1 | 2/2019 | Schoenberg |
| 2019/0139115 | A1 | 5/2019 | Wickam |
| 2019/0171743 | A1 ‡ | 6/2019 | Ding .................... G06F 16/217 |
| 2019/0268443 | A1 | 8/2019 | Loynd et al. |
| 2019/0347717 | A9 | 11/2019 | Erbey et al. |

‡ imported from a related application

RESOURCE MANAGEMENT SYSTEM

PRIORITY CLAIM

This application is a continuation of U.S. Ser. No. 16/998, 614, which is now U.S. Pat. No. 10,997,559, which is incorporated herein by reference.

BACKGROUND OF THE DISCLOSURE

1. Technical Field

This disclosure relates to structural management, and specifically to systems that methods that manage big data.

2. Related Art

Resource coordination is challenging. Some processes attempt to provision materials and services but fail to assimilate them into a holistic resource. Some processes attempt to provide access to materials and some attempt to provide access to the skills needed to process them. These systems attempt to provision access via separate front-facing software.

Known processes attempt to manage access to a resource without managing the screened and vetted professionals that install them. Such systems fail to efficiently process large data associated with these resources and services. They cannot manage multiple resources and the large data associated with them. As such, it is difficult to track progress and establish measurable objectives making the monitoring processes meaningless. Adaptability and flexibility is a challenge for these systems, as many are custom-made and personalized to different end-users.

DETAILED DESCRIPTION

The disclosed resource management systems provide rich visualizations. The systems streamline processes across selections, procurement, and services using intelligent caching and proxies that simplify managing remote resources and large data. The systems generate graphically rich interactive screens that dynamically render project information over time through invisible mappings while guaranteeing financial commitments. The mappings establish associations between resource addresses for remote sources and remote destinations to local sources through intelligent caches and proxies. The invisible mappings re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and mobile apps by the system's knowledge of its users. When access is granted, end-users coordinate services, enter observations, request assessments, establish analytics, track outcomes, track quality, and receive guarantees.

To access objects that render content, connections are usually made between remote resources and local interfaces via remote requests and responses. Establishing network connections for each request/response for materials and services consumes network bandwidth and causes delay as many data exchanges must occur before a request can be serviced. Further, when content must be collected from multiple remote resources, some resources include deep links that contain the memory location (address) of embedded content that may be served outside of the network domain. Some linked content is served by remote resources that redirects the user to compromised external environments not served by the intended-origin server and/or network. Such link surfing may violate a same-origin server policy and/or a common domain security policy that some enterprise systems require. Subjecting users to domains outside of their demilitarized zones can cause bottlenecks that cause some origin severs to stop responding to user requests while waiting for remote responses.

Figure 1:
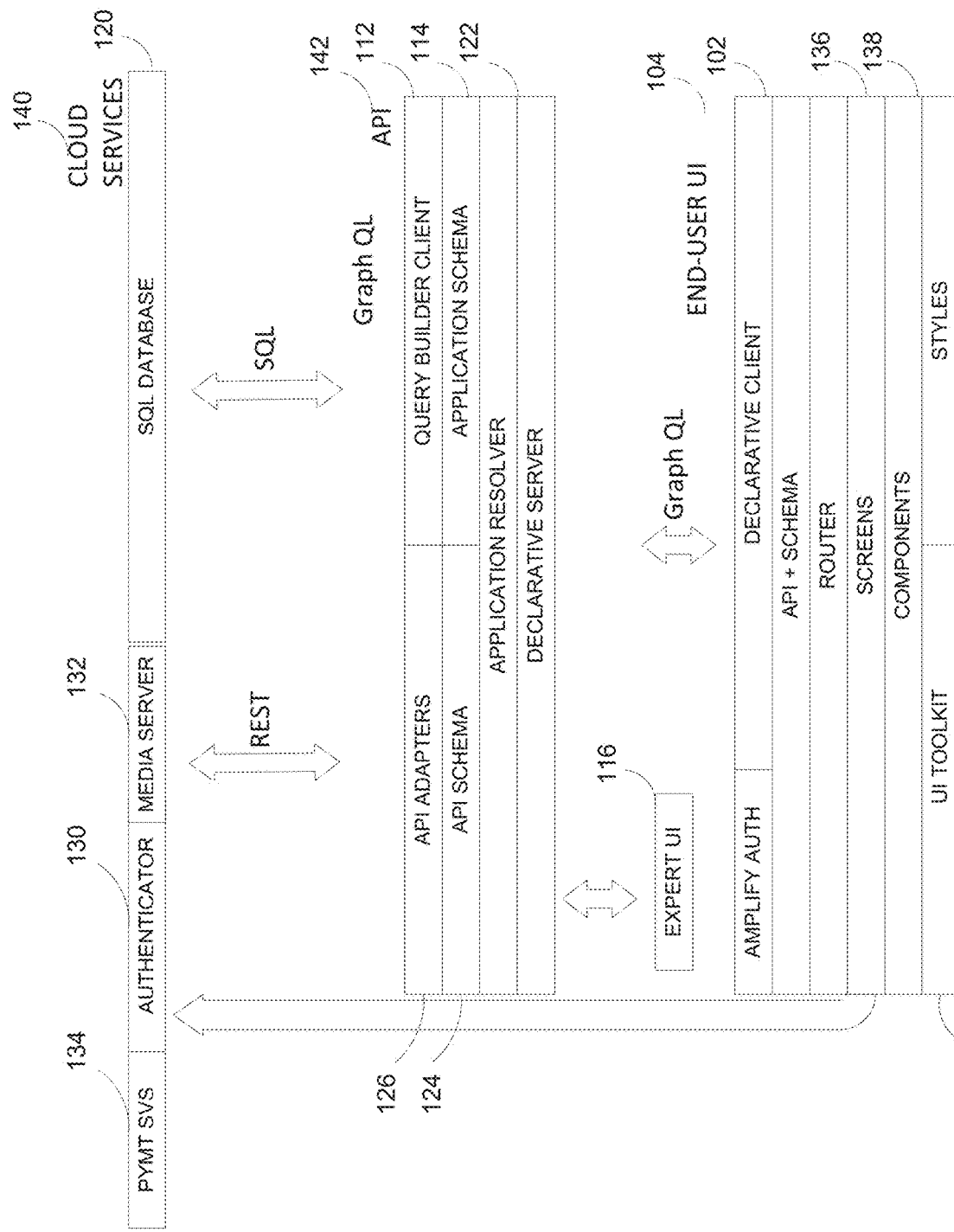
FIG. 1 is a system diagram of a resource management system architecture.

Rather than requiring end-users to access multiple remote external resources when managing desired resources, the nationwide resource management system of FIG. 1 uses a declarative client 102 for data fetching, data retrieving, load tracking, error rate tracking, caching, and updating end-user and expert interfaces 104 and 116. When an end-user's interface 104 request hits an application server through a secure transfer protocol such as a secure version of Hypertext Transfer Protocol (HTTPS), for example, a load balancer distributes the network traffic across multiple servers and/or server clusters. The request originates from the primary stack that requests services from the resources required to run and service an application. The resources may include a Web server, a database, and networking rules. Using a JavaScript library that supports the end-user interfaces such as a React-based web user interface-framework, the systems serves end-user interfaces (UIs) through UI components and guidelines directed to many components from interface layouts to language selections through a UI Toolkit 110 shown in FIG. 1. The systems provide several layout components including those based on a Flexible Box Module or flexbox that may serve as a dimensional layout module that provides accessibility, modularity, responsiveness, and theming and further reflects color selections, option type selection, and layouts. An exemplary React-based framework uses grommet in some alternate processes.

The application programming interface (API) that comprises a set of software routines used by the declarative client 102 is a graphical API. The declarative client 102 uses a normalized, in-memory cache to dramatically speed up the execution of queries. The cache normalizes the query results before saving them to memory by splitting results into individual objects, assigning unique identifiers to each object, and storing the objects in a flattened data structure associated with their unique identifiers in memory. A flattened data has no hierarchical order with no two files having the same name even in different directories. A unique identifier may combine the objects' names with a sequential operator designation and/or identifier and/or may specify the objects' path with the associated query. The in-memory cache is a device used to store data temporarily and deliver data at a rate faster than the rate the data is received. It improves system performance by reducing the number of times the declarative client 102 must go through the relatively slow process of reading from and writing to a conventional memory.

The declarative client 102 sits on immutable images that are served by Web services, like a secure private cloud service platform 140. The immutable images are different from computer snapshots as once they are made, they do not change. In other words, once images are formed, they can be deleted but cannot be modified. This ensures that once an image is created for an application, such as a home repair services app or a web home repair service app, for example, the working instances of the image won't break because of various modifications. If shared, the image functions as a new virtual home repair service application machine using the immutable image. The new machine will run like the original machine. In this architecture, images are analogous to templates, in which containers are built. Some containers run the images with a writable layer on top of the immutable image, meaning the system can modify the image only within the virtual walls of the container. In some systems, the declarative client 102 sits on Docker images that are served by secure cloud services 140 that includes database storage 120.

To avoid provisioning and managing server services, an abstraction layer in the form of a serverless compute engine process the containers that are used to access backend databases through middleware. At the core of the compute engine is a runtime API (not shown) that receives the images and tasks for the containers to process. The system creates a task definition based on the selected images, determines the CPU shares (e.g., the portion of the central processing unit allocated to the project), memory requirements, environment variable, entry point and command line arguments. Once a task is scheduled, a service API (not shown) is invoked that runs and maintains the desired number of tasks. Once processed, an application load balancer routes the processed traffic to the desired middleware port of the middleware stack.

Figure 18:
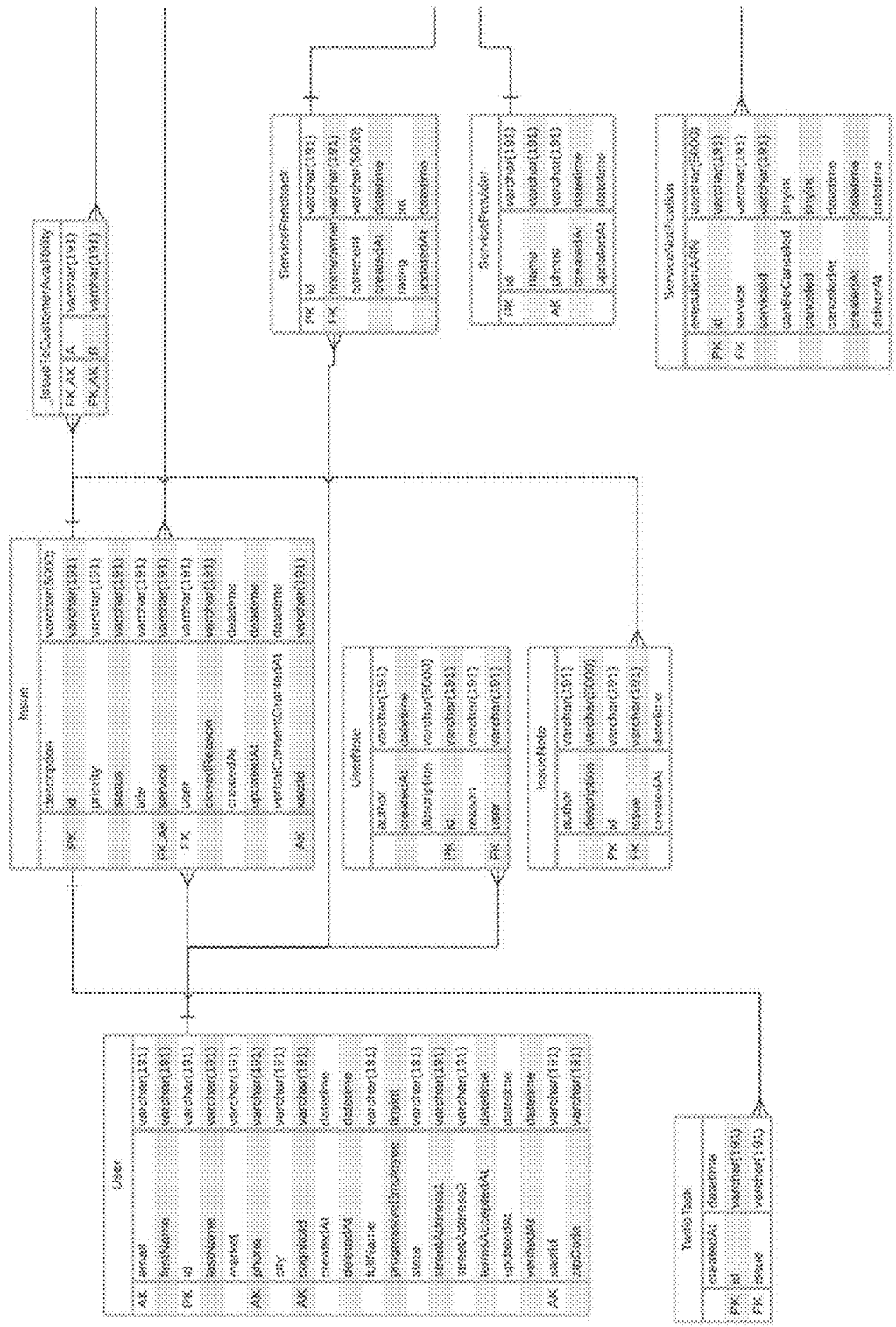
FIGS. 18 and 19 show an exemplary database schema.
Figure 19:
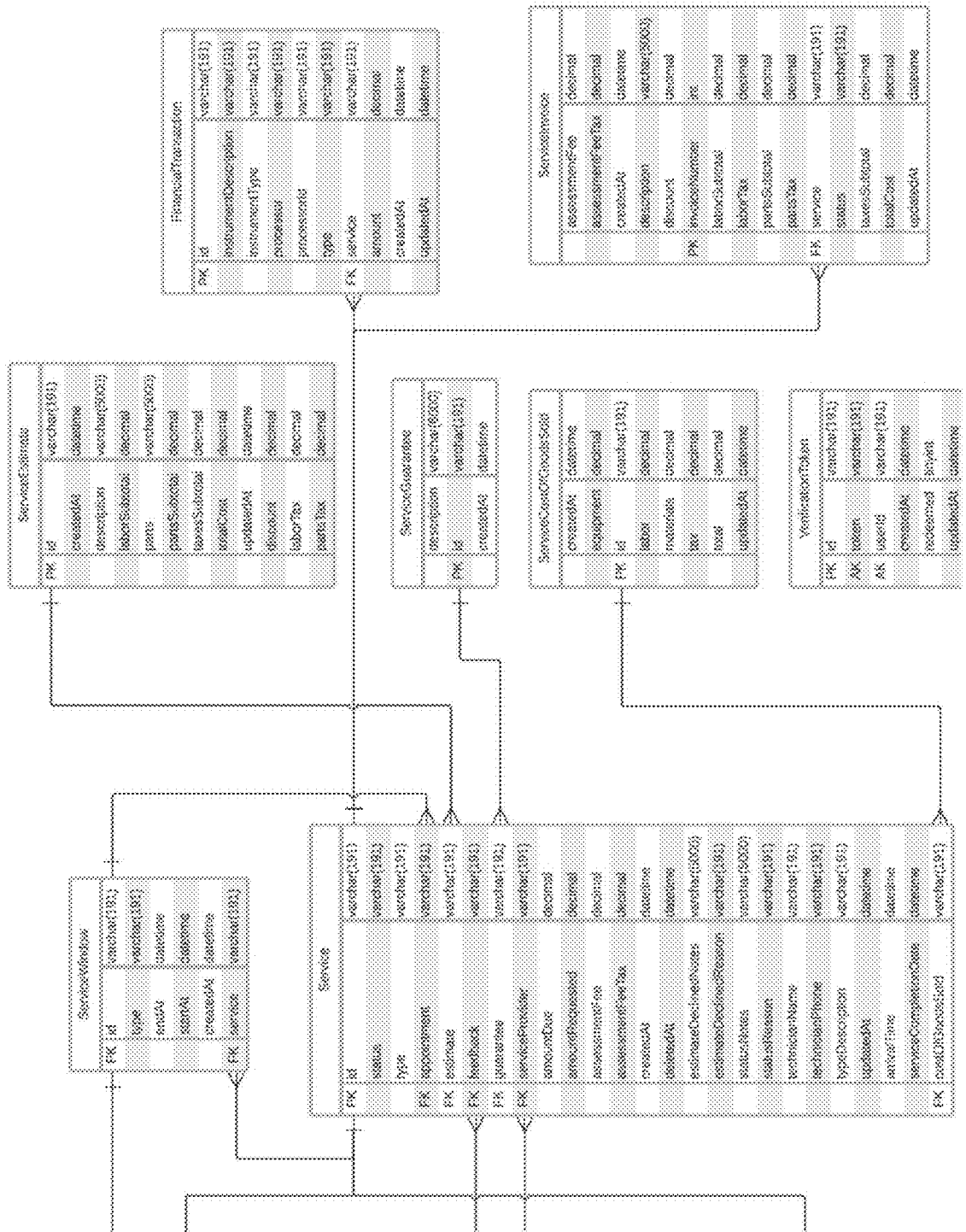

Using a database toolkit, an auto-generated query builder client 112 is created that resides in the middleware stack. The auto-generated query builder client 112 uses a schema 114 that defines the application models in a data model language. The connection to a database is used to form the query generator client 112. The schema allows the resource management experts and/or engines that access the resource management system via an expert user interface 116 to define the relationship fields without revealing the keys in the underlying database 120. In the application schema 114, a resource management expert or expert engine specifies the database connection through an environment variable and a data model that defines the application models, such as the exemplary connections shown in FIGS. 18 and 19. In operation, the data models are a collection of models that represent entities of an application model. The models have two functions. The first is to represent the desired underlying relationships between the objects stored in database 120 and the second is to provide a foundation for the queries executed by the auto-generated query builder client 112. The middleware may include enterprise level security through a resolver API 122, application schemas 124, and API adapters 126. The API adapters 126 create a virtual web service on a defined port that responds to Web requests.

The auto-generated query builder client 112, like the declarative client 102, renders queries that resemble a GraphQL service in FIG. 1, making the stack exchanges more graphical from top to bottom. Once the simulated GraphQL service is running, the SQL stack in the database services receives the GraphQL queries which it validates and executes. The SQL stack processes the received query to ensure it only refers to the type of fields defined in the relational database management system 120. It then runs the provided functions and renders a result.

Figure 2:
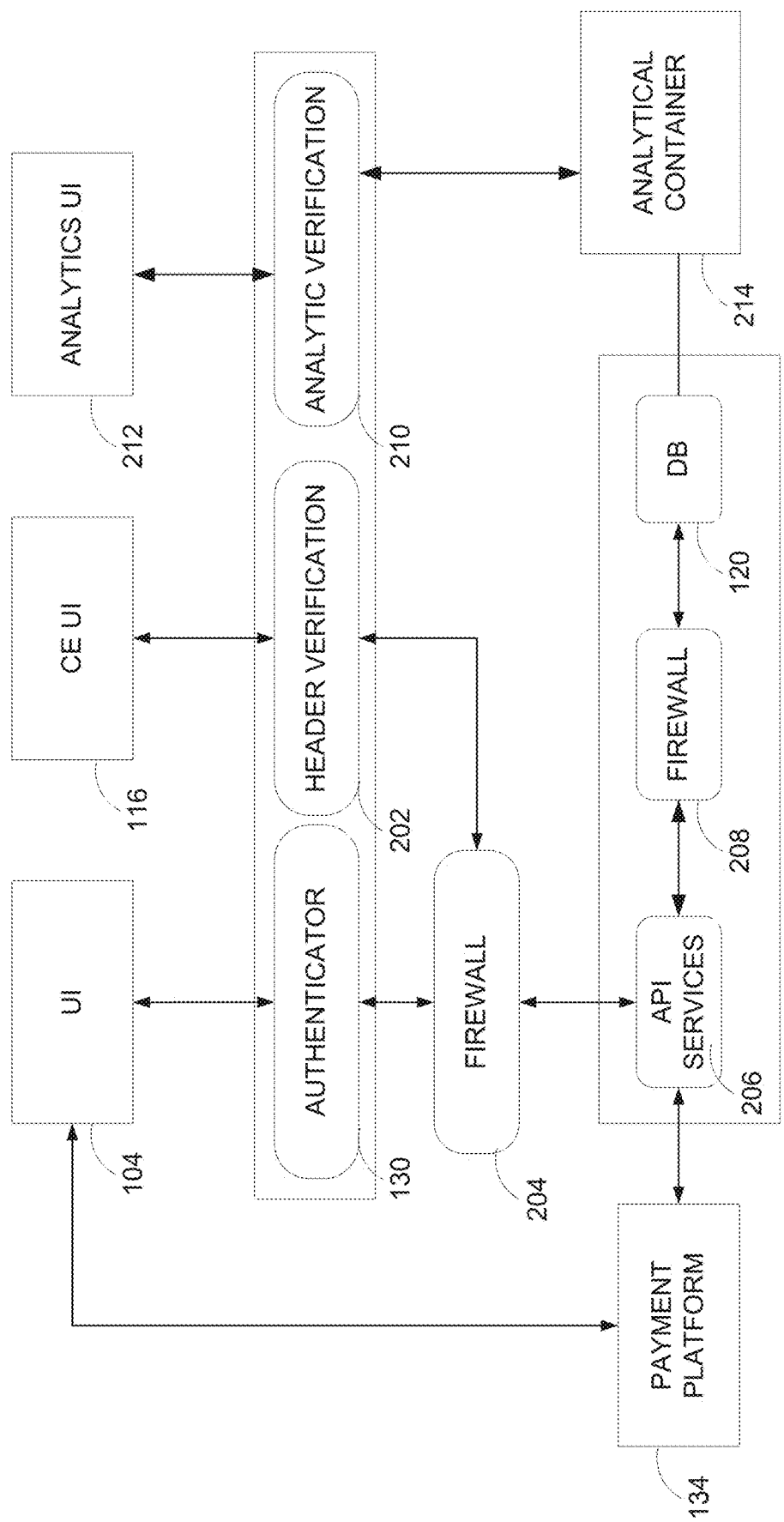
FIG. 2 is a system diagram of a resource management system authentication systems and transaction platform.
Figure 3:
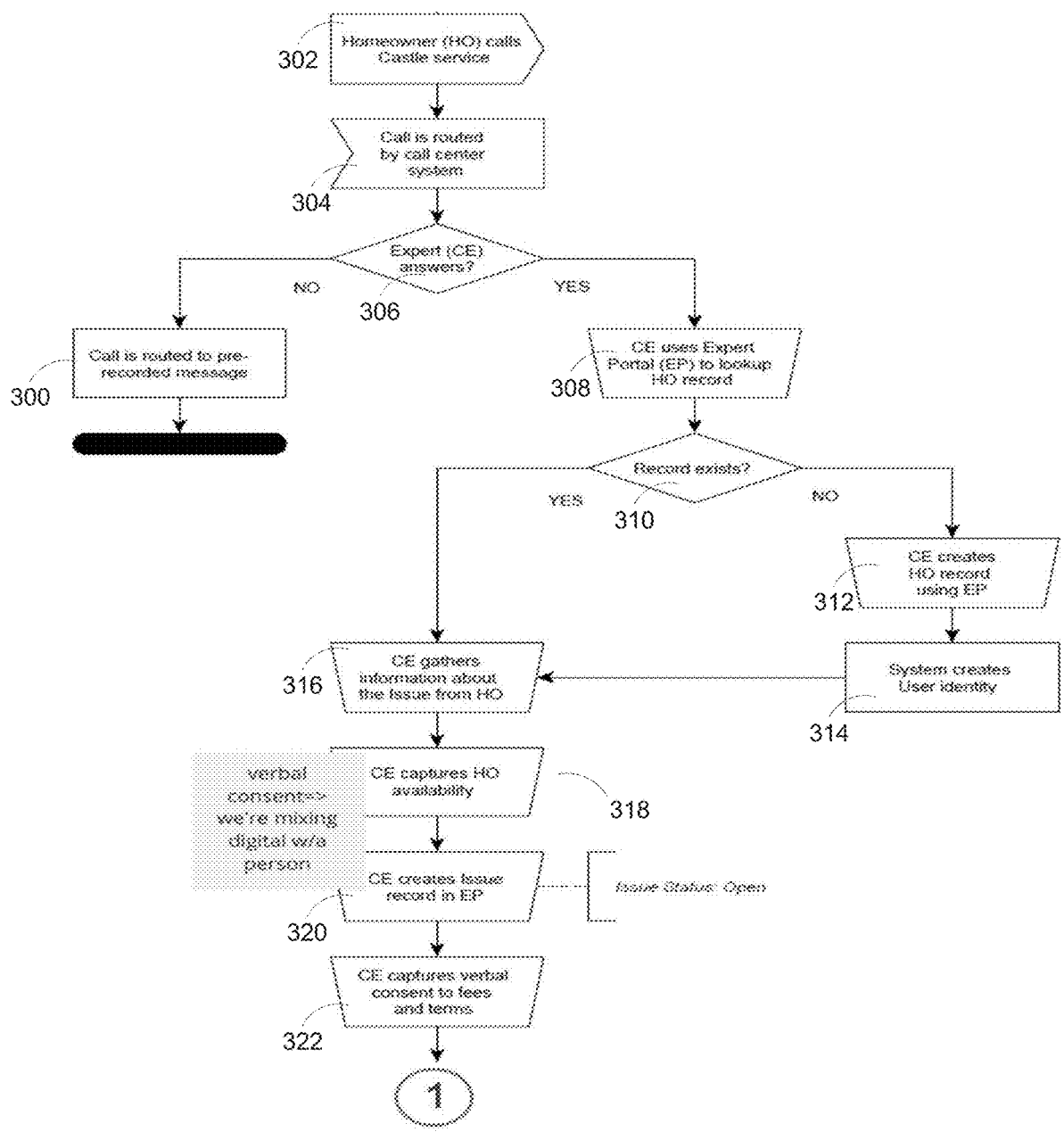
FIGS. 3-7 are process flows of an exemplary turnkey home repair process executed on a resource management system.
Figure 4:
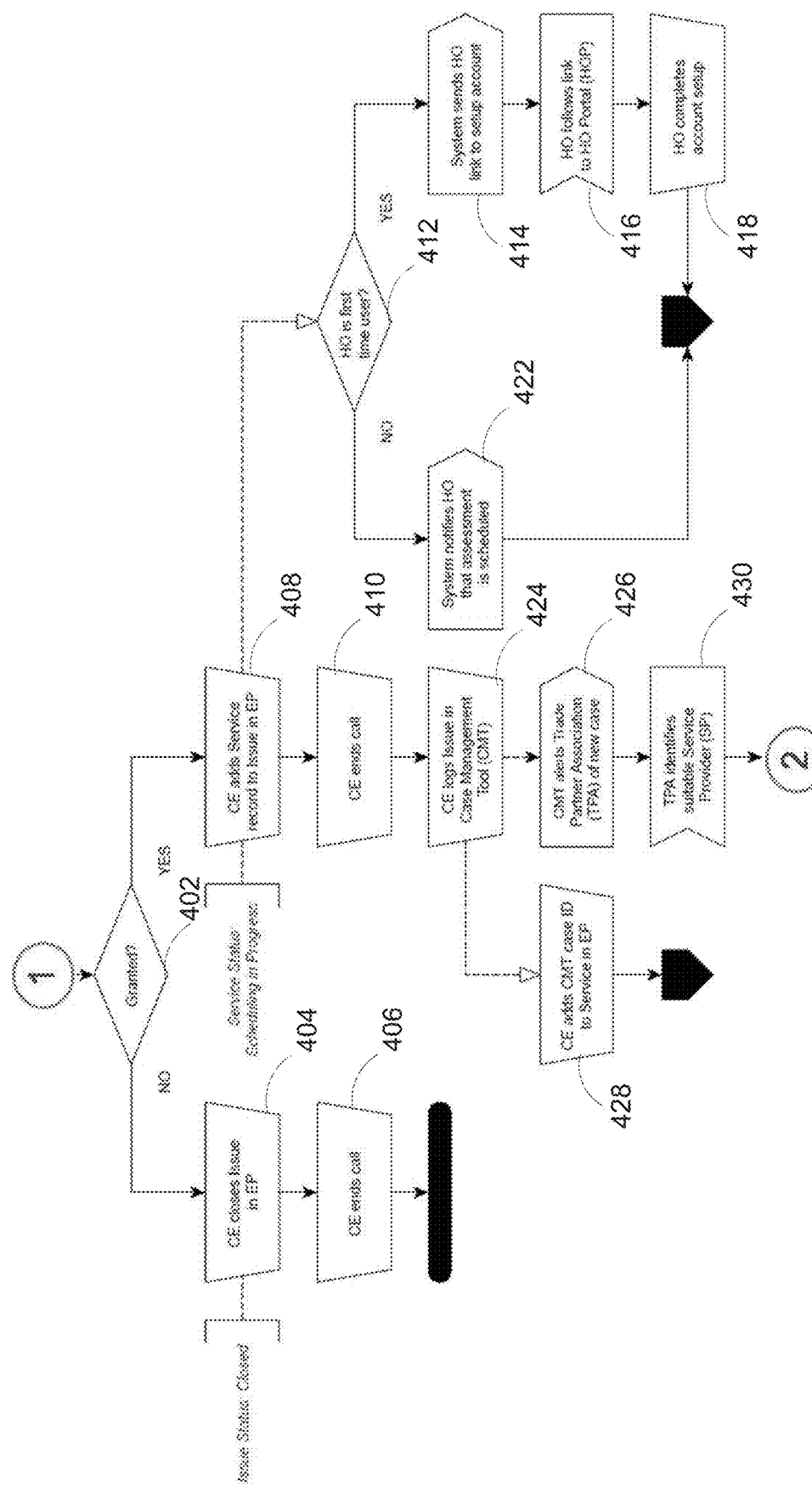
Figure 5:
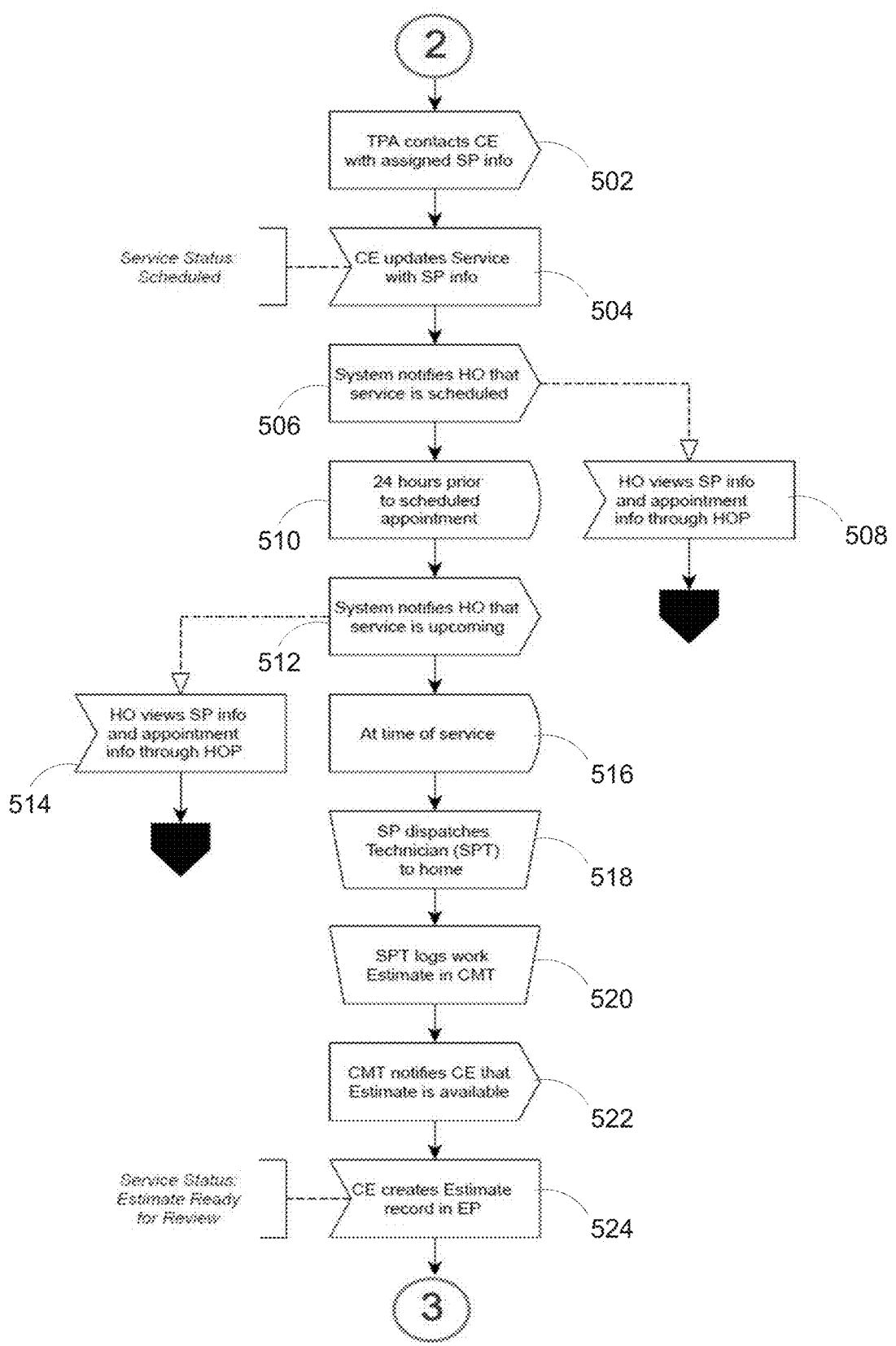

Access to the resource management system is provided through authentication and authorization servers 130, shown as an authenticator server in FIG. 2. The authentication is created for each end-user, which may include a project requester, a service expert, and/or an expert system. The systems allow end-users to access the resource management system at the security level at which they are assigned. For example, an end-user at a restricted security level, may access the resource management system through a web portal via an application only defined by the UI Toolkit 110 and a set of declarative client 102 GraphQL APIs. The GraphQL APIs are served by a database that are also constructed around GraphQLs.

The resource management system may also serve voice, video, and messaging through a software layer via a server 132 that connects and optimizes external communications, as shown in FIG. 1. Through software developer kits (SDKs) and voice APIs, and Web and mobile clients, end-users may reach the resource management system and resource management experts/engines as they are needed. A real-time video infrastructure and video SDKs embed video collaboration and context-sharing into resource management system, with the underlying infrastructure handling signaling, registration, and media relay. Messaging APIs and messaging SDKs send and receive short message services (SMS), multimedia messages (MMS), and IP messages globally from Web and mobile apps, and use intelligent delivery features to ensure messages are received by the resource management experts.

A full-stack payment platform 134 serves payment services to the resource management system, as shown in FIG. 2. The payment platform 134 replaces the usual models of outsourcing payments to different gateways and merchant accounts, from a single-touch payment action via an app and/or browser to mobile SDKs. In operation, an end-user interacts and authenticates with the resource management system while interacting directly with the payment platform 134. When the end-user is ready to make a payment, the resource management system directs the end-user to the full-stack payment platform 134 that runs on servers or clusters (the term "server(s)" used in this disclosure collectively refers to server clusters) that are separate and remote from the resource management system and clusters. The resource management system directs the end-user's application and/or interface, such as browser request, for example, to the required authorized payment platform 134. Thereafter, the required authorization is pushed to the full-stack payment platform clusters 134 that process the payment and creates and pushes a payment token to the end-user UI 104, which payment is drawn against. A token comprises a nonreducible unique data structured element (e.g., the nonreducible nature maintains and ensures financial security) that describes the payment status that is usually parsed. In some systems, it comprises a textual element. The separation between the resource management system and a stand-alone payment platform 134 reduces the need to migrate users to new platforms, assures interoperability with older legacy systems, and allows the resource management system to accept and process input intended for later system versions (e.g., forward compatibility).

When a payment token issues, it passes through authentication and authorization servers 130 (described below), a firewall 204, and API servers 206, when it is pushed by the end-user interface 104. When an end-user authorizes payment, the resource management system queries the end-user interface 104 for the payment token and additional information, such as information relating to case identifiers and descriptions about the tasks associated with them. The resource management system further transmits a request for payment with the token directly to the payment platform 134 without passing it through intermediate components. Thereafter, the payment platform 134 validates the token. If successful, the transaction is completed and the additional information is stored in a resource management system database 120 (RSM database 120). This allows the transaction to be correlated with other transactions. If a transaction fails or is later rejected, the failed payment is mediated to resolve the failure. Since payments are subject to charge backs and disputes, the payment status record in the RSM database 214 is not recorded as a permanent status. Instead, it reflects the end-user's current payment state.

When an end-user logs onto the resource management system, the user's credentials are compared to credential data maintained in the user profile in the authentication and authorization servers 130 The authentication and authorization servers 130 collect a user's profile attributes into directories called user pools that the user's mobile app or web app processes to configure their accessibility rights to the resource management resources. An identity pool consolidates end-user information, which client access platforms, devices and operating systems access from identity groups. Data synchronizes with the resource management system when an end-user's device is online, allowing an end-user to access the same information on another device without moving or entering that same information into that device. Data can also be saved in a database, such as the RSM database 120, while offline before reconnecting to the computer network. The authentication system servers associate data sets with identities and saves encrypted information in the form of cryptographic keys or value pairs that are part of an API key authorization header stored in a synchronization store (not shown) in the resource management system and validated by the header verification servers 202.

By accessing a plurality of device profiles stored in the screen layer 136 of the server cluster 108, some alternate resource management systems also deliver content to most device profiles, form factors, and/or device functionalities by identifying unique combinations of characteristics and capabilities that differentiate devices from other devices through device profile comparisons and matching. By combining device data with situational information about the user, such as, for example, the user's/expert's location (e.g., the user's/service provider's device location provided through global positioning data rendered by user's/service provider's device), IP connections, network connection speeds, and/or prior use identifiers that are stored in the user's/service provider's device profile and/or SQL database 120, some alternate authentication and authorization servers 120 confirm user identities by making device profile comparisons at the alternate authentication and authorization servers 120 as a second form of authentication rendering a two-way authentication. The two-way authentication comprises an alternate embodiment. Once a user and/or device is identified and authenticated, the data delivered is configured to the device's form factor. Some server clusters 108 tailor the data and/or functions that the resource management system provides to the identified and authenticated device's capabilities.

Once an end-user and/or device is authenticated by the authenticator servers 130, a user session is initiated and the user's requests are passed through a firewall 204 before they hit the API servers that provide API services 206. The API servers 142 communicate with the RSM database 120 through a second firewall 208. API servers 142 and RSM database 120 do not touch any publicly accessible networks like the Internet. Resource management experts and/or automated engine access is gained through an API key authorization header that is previously assigned in some systems that is validated by the header verification servers 202, and thus does not require validation by the authenticator servers 130.

A finance and accounting interface 212 allows the resource management system to track finance and execute analytics. The resource management system provides access to system data through instance of the RSM database 120 served via an analytical container 214 that is updated at batched periodic time intervals or at a scheduled time intervals.

The resource management system has many uses, including serving web home repair service apps that provide access to resources through landlines, mobile devices and WebRTC clients. In the exemplary use case shown in FIGS. 3-7, an end-user, such as a homeowner, calls into a call center or network portal at 302 and 304. The call is routed to a resource management expert and/or fully automated expert engine (expert engine), which in this exemplary home repair service app process are referred to as a Castle Expert (CE). Through another network portal, the CE accesses the home-owner's records at 306 and 308. If the CE is unavailable, the communication triggers a response at 300 and if homeowner's records cannot be found at 310, the CE collects the homeowner's profile attributes through an expert portal (EP) at 312. The attributes are processed to create the end-user's identity and the homeowner's user pool at 314. At 316 and 318, the CE harvests information about the issue to be addressed. The resource management system also captures the homeowner's availability via availability windows capturing calendar dates and time periods in which the homeowner is available, and when the issue is accessible, and creates a record through the EP that is retained in a memory at 320. At 322 and 402, the resource management system solicits the homeowner's verbal acceptance of an onsite assessment and its corresponding inspection and assessment fee. If the homeowner declines, the CE closes the issue via the EP and terminates the call at 404 and 406. If the offer is accepted, the resource management system generates a service record and thereafter terminates the call at 408 and 410.

If the homeowner is a first-time user, the system transmits an address and a protocol to be used to access the system via a user-actuated link at 412-416. The protocol includes a set of rules that enable the homeowner to connect to the resource management system and exchange information automatically. Once connected, the end-user (the homeowner) completes the account set up at 418. If the end-user is not a first-time user, homeowner recognition triggers the notification that an assessment is scheduled at 422.

With the details of the issue logged into a service record via case management tools (CMT), the CE adds a CMT case identifier to the expert portal and transmits an alert to a trade partner association engine of the new case at 424-426. The trade partner engine identifies and assigns one or more suitable screened and vetted service professionals (SP) and transmits SP data to the CE EP portal, at which the system transmits a notification of the scheduled service to the homeowner at 430, and 502-506 in FIGS. 4 and 5. The notification may comprise a SMS, text message, and/or email with a computer link that identifies the scheduled service, that when activated at 508, prompts the homeowner to enter a password, which advances the web home repair services app to a summary page. At a predetermined time before the scheduled service is to be performed, the resource management system transmits a reminder to the web home repair services app at 510-514. Like the notification, the reminder may comprise a SMS, text message, and/or email with a computer link that identifies the scheduled service that when activated, advances the web home repair services app to a summary page. In some systems, the reminder is automatically generated from the repair service app too, and provides the homeowner with an asynchronous notification without web access. At the time of service, the SP dispatches a service provider technician (SPT) to the home at 516 and 518 to render an estimate.

Some systems use a secure two-way portal to communicate with SP and SPTs. This portal allows CE to send and receive secure messages, documents, and estimates. When an assignment event occurs via the portal, the system enter time/date stamps, which thereafter occurs automatically at each milestone event. The assignment event is routed to an SP and thereafter an SPT. Some portals designate SP and SPT availability unique geographic identifiers. The system is capable of tracing SP and SPT availability. When an assignment event occurs, the system serializes the input with a time/date stamp. When the SP accepts the assignment, the system records a second time/date stamp to record the event. When an SP rejects an assignment event or a predetermined amount of time passes, the system automatically withdraws the SP delegation and transmits it to another SP. Assignment events include a statement that specifies the transmission protocol and an identifying number associated with the assignment and a preformatted estimate template. Some estimate templates include guardrails based on system practices that are customized to a desired application. Some assignment events include content, such as a recommended price list based on a geographic area, that are modified periodically. When the assignment is delegated, the inspection date, start/finish dates, and estimates are upload timestamped. The SPT enters an estimate through the CMT, which causes the resource management system to transmit a notification to the CE and results in an estimate record in the EP at 516-524.

Figure 6:
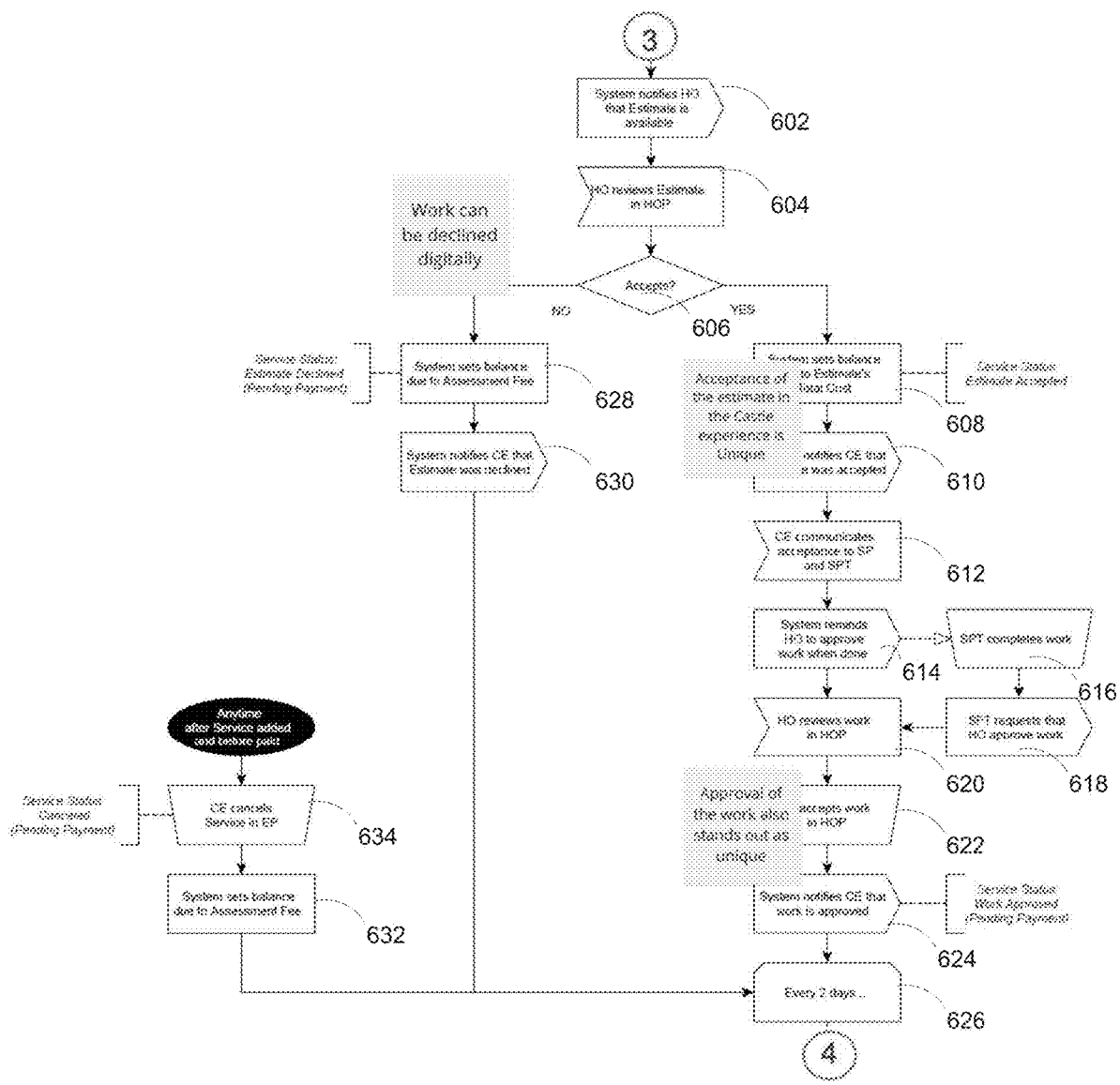

In response to the creation of the estimate record, the resource management system transmits a notification and secure document to the homeowner that facilitates a review and an electronic acceptance of the estimate at 602-606 in FIG. 6. The resource management system eliminates the need for the end-user (here, the homeowner) to print, sign, and return physical documents using known document acceptance practices. Instead, some resource management systems grant access to the secure document via a shared cryptographic secret that grants access to the document, and electronically signing by clicking (e.g., actuating) on a secure e-signature button. A shared secret comprises cryptographic data, known only to the parties involved, in a secure communication. In some alternate resource management systems, the clicking on the secure e-signature button redirects the end-user (e.g., the homeowner) to a secure website through a combination of hypertext transfer protocol (HTTP) and a secure socket layer (SSL)/transport layer security (TLS) that confirms the end-user's signature and automatically triggers an email and/or text message to the end-user and CE portal. As a result, the most recent version of the executed agreement is stored in the RSM database 214 for future retrieval.

Acceptance (e.g., acceptance via electronic means) of the estimate triggers the resource management system to calculate the balance due, notify the CE of the acceptance, and trigger one or more automatic communications (e.g., an SMS, email, etc.) of the acceptance to the designates SP and SPT and a communication to the homeowner to approve the work when it is completed, which triggers a CE notification at 608-624. Rejection of the offer triggers the resource management system to set an assessment fee, transmit a notification of the rejection to the CE, cancel the estimated services, and calculate open balances at 628-634.

Figure 7:
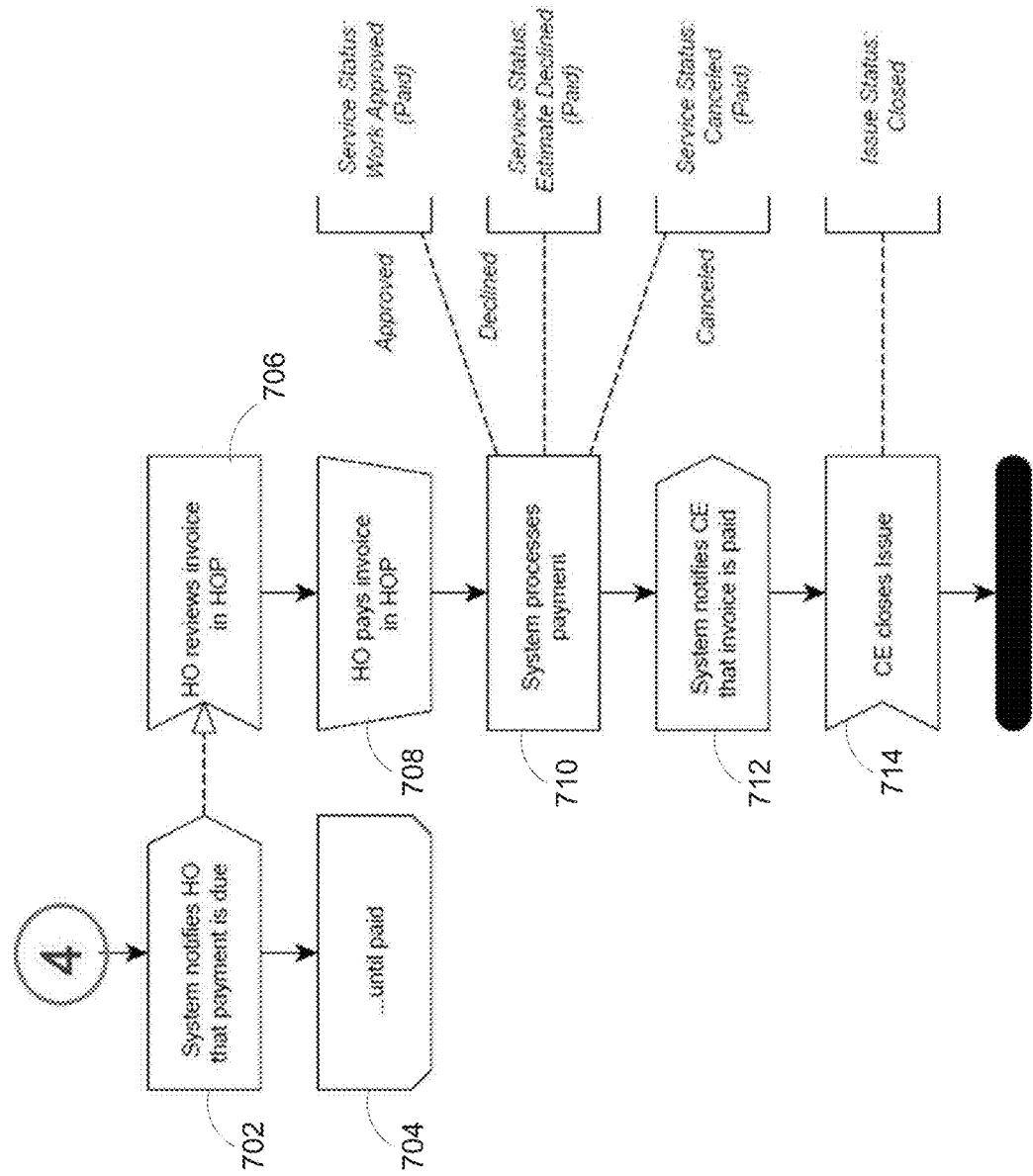
Figure 8:
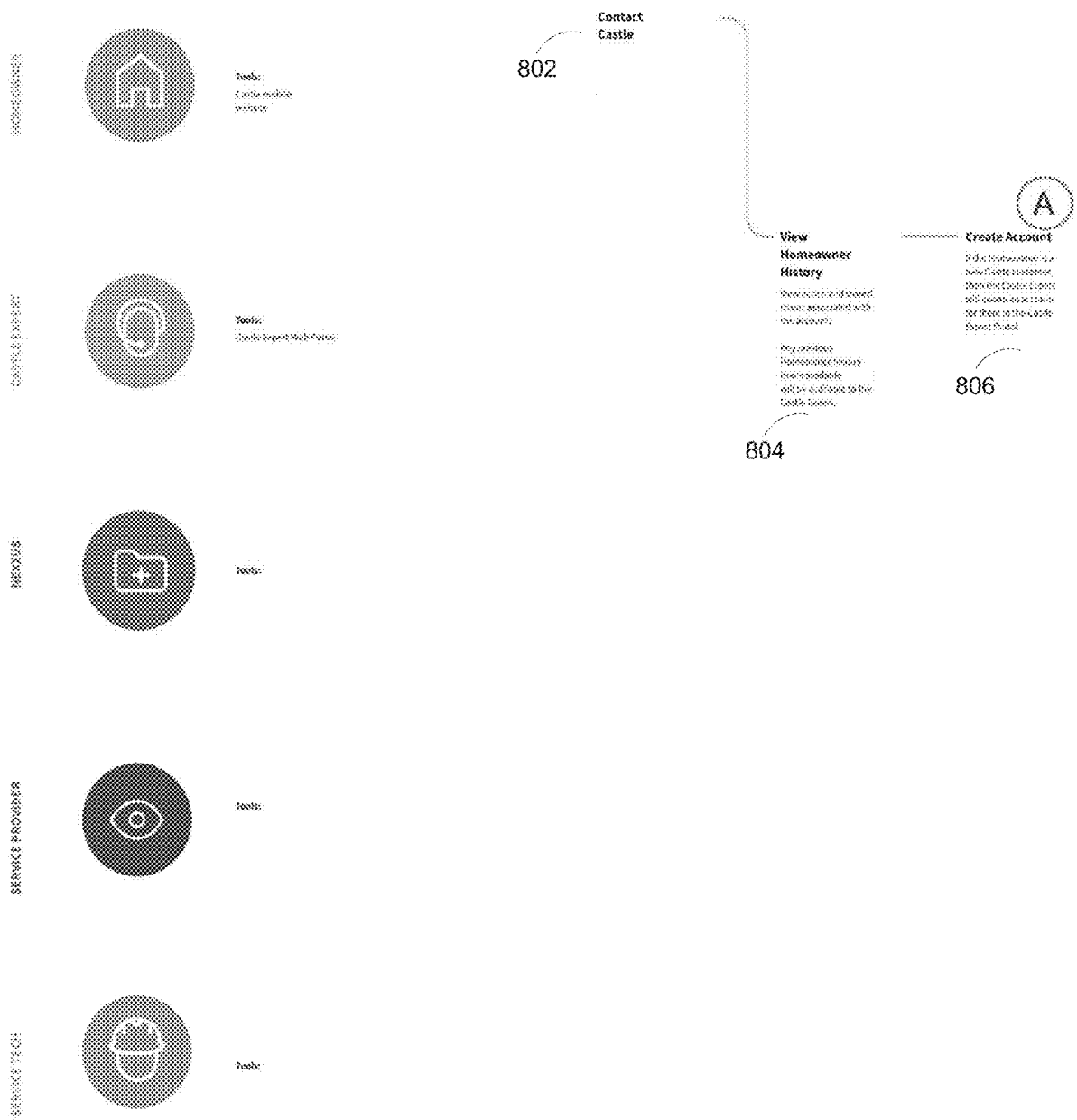
FIGS. 8-15 are alternate process flows of an exemplary turnkey home repair process executed on a resource management system.
Figure 9:
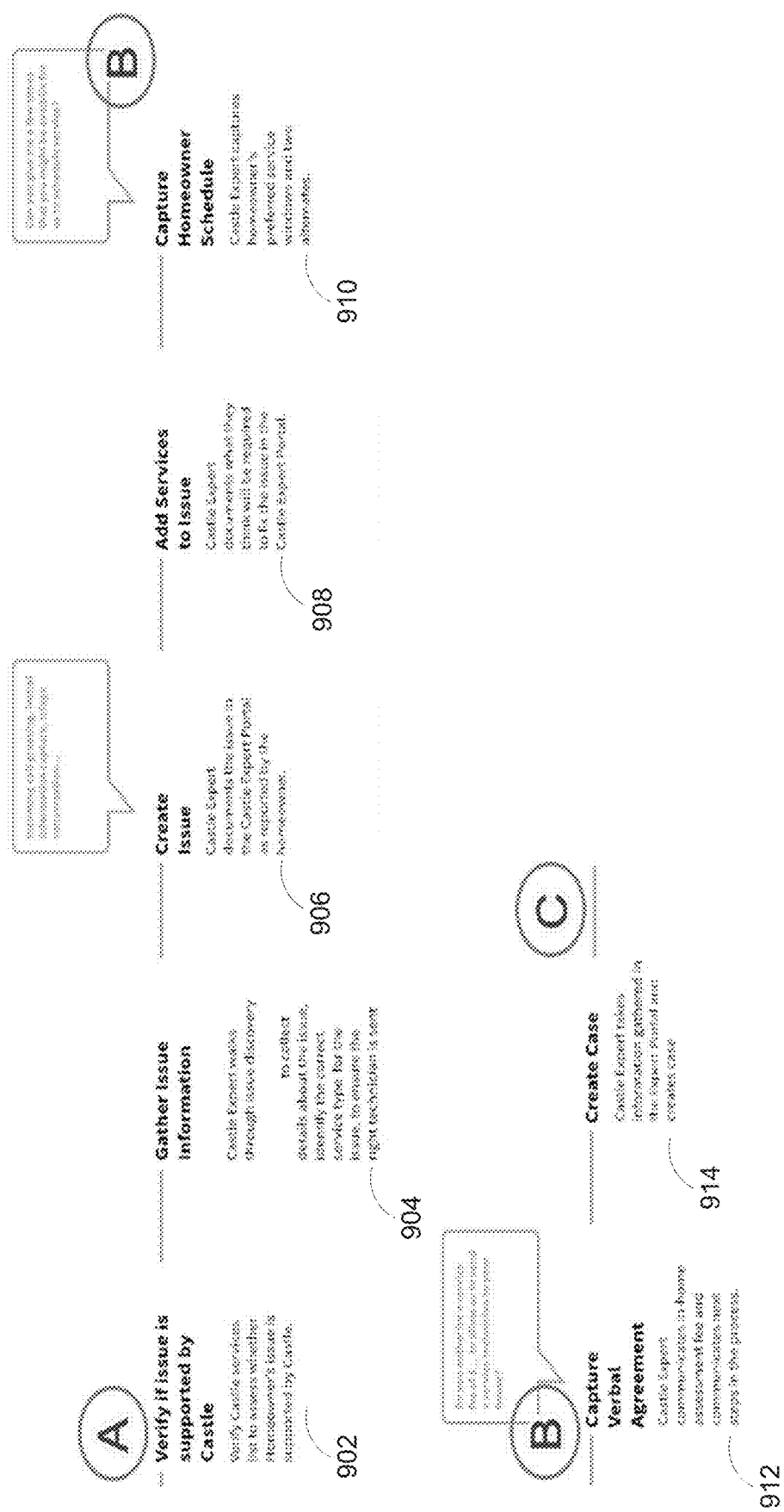

With the work completed by the SPT and approved by the homeowner, or when the offer is rejected by homeowner, the resource management system notifies the homeowner that the payment is due, which is then repeated until the invoice is paid at 626, 702 and 704, as shown in FIGS. 6 and 7. Payment triggers the resource management system to process the payment and notify the CE to close out the case at 708-714. Unlike known services, the system provides a concierge service. Instead of requiring users to spend time searching for qualified and responsible service repair technicians, the disclosed turnkey home repair process application leverages the in-depth knowledge of the CE (e.g., automated expert engine in some systems) that guides the homeowner in home repairs using a simple and easy to understand language. The home repair service app provides referrals to and commitments from screened and vetted professionals. The disclosed schema is unique and efficiently represents end-users, cases, SPs, and proven solutions to home maintenance issues. Some alternate turnkey systems are fully automated with the initial estimates, post-audit analysis, and all responses occurring entirely without human intervention (e.g., automatically) through chatbot engines, such as those disclosed in Chatbot Artificial Intelligence assigned U.S. Ser. No. 16/374,495, which is herein incorporated by reference in its entirety. Some fully automated turnkey systems process user-provided photographs, which may also include logic that derives output from a knowledge base through artificial intelligence.

Some web home repair services apps are rendered through mobile devices, such as the exemplary home repair mobile app referred to as Castle, in the processes shown in FIGS. 8-15. The processes begin when the end-user (the homeowner) contacts Castle's backend through landlines, email, SMS, a chat window, etc. at 802. If the home repair mobile app system does not have a homeowner history, the system creates an account and harvests dwelling and homeowner information through the EP at 806. Otherwise, access to historical records is provided at 804. At 902, the system verifies that the issue needing repair is supported by the resource management system (Castle) in FIG. 9. The system captures the issue in the EP and captures the homeowners schedule and three preferred service windows at 904-910. The system gathers the information and generates a case in a project control center of the RSM database 120 at 914 following the capture of the user's verbal consent at 912. The project control center is where the resource management systems manages projects.

Figure 10:
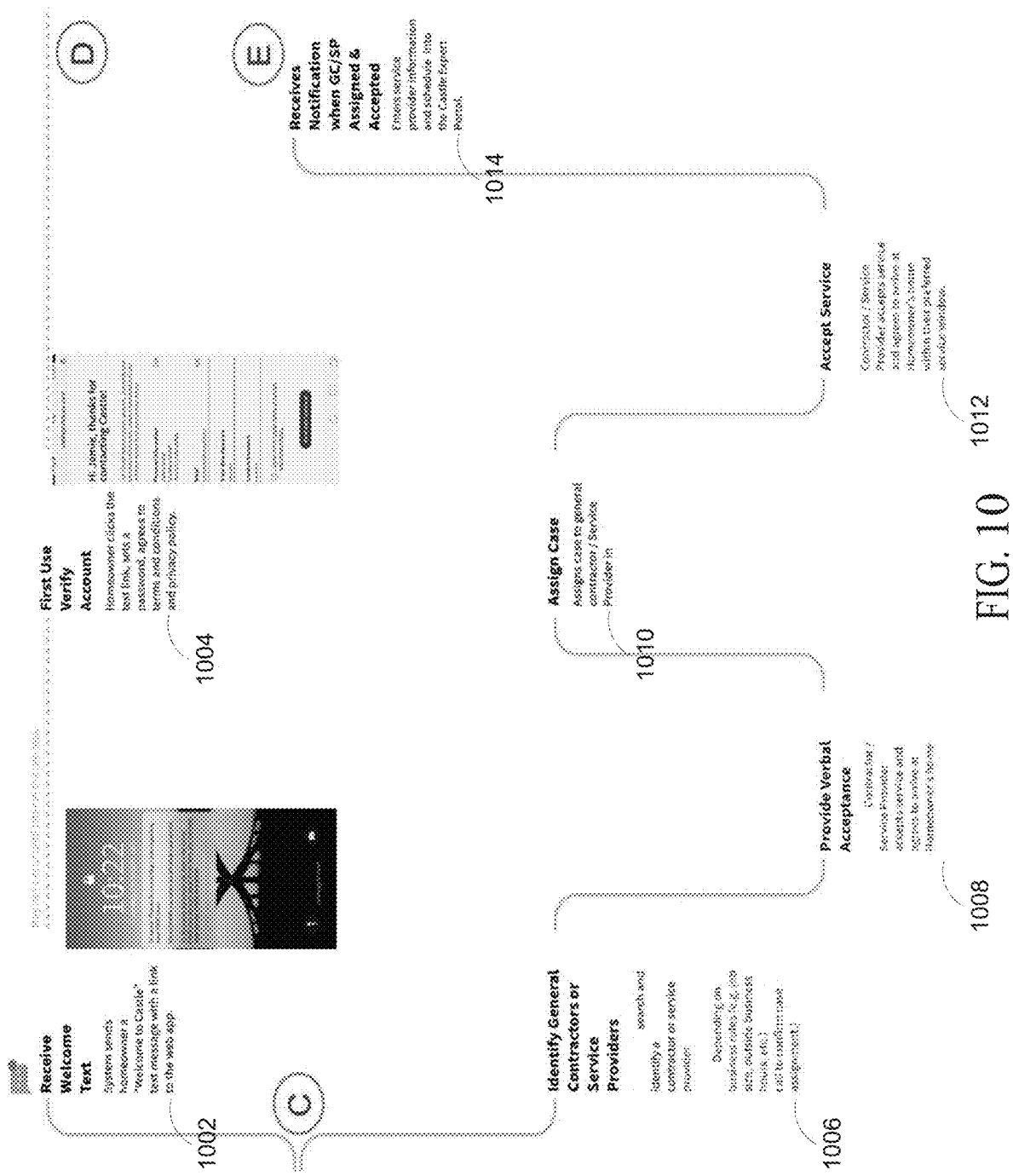
Figure 11:
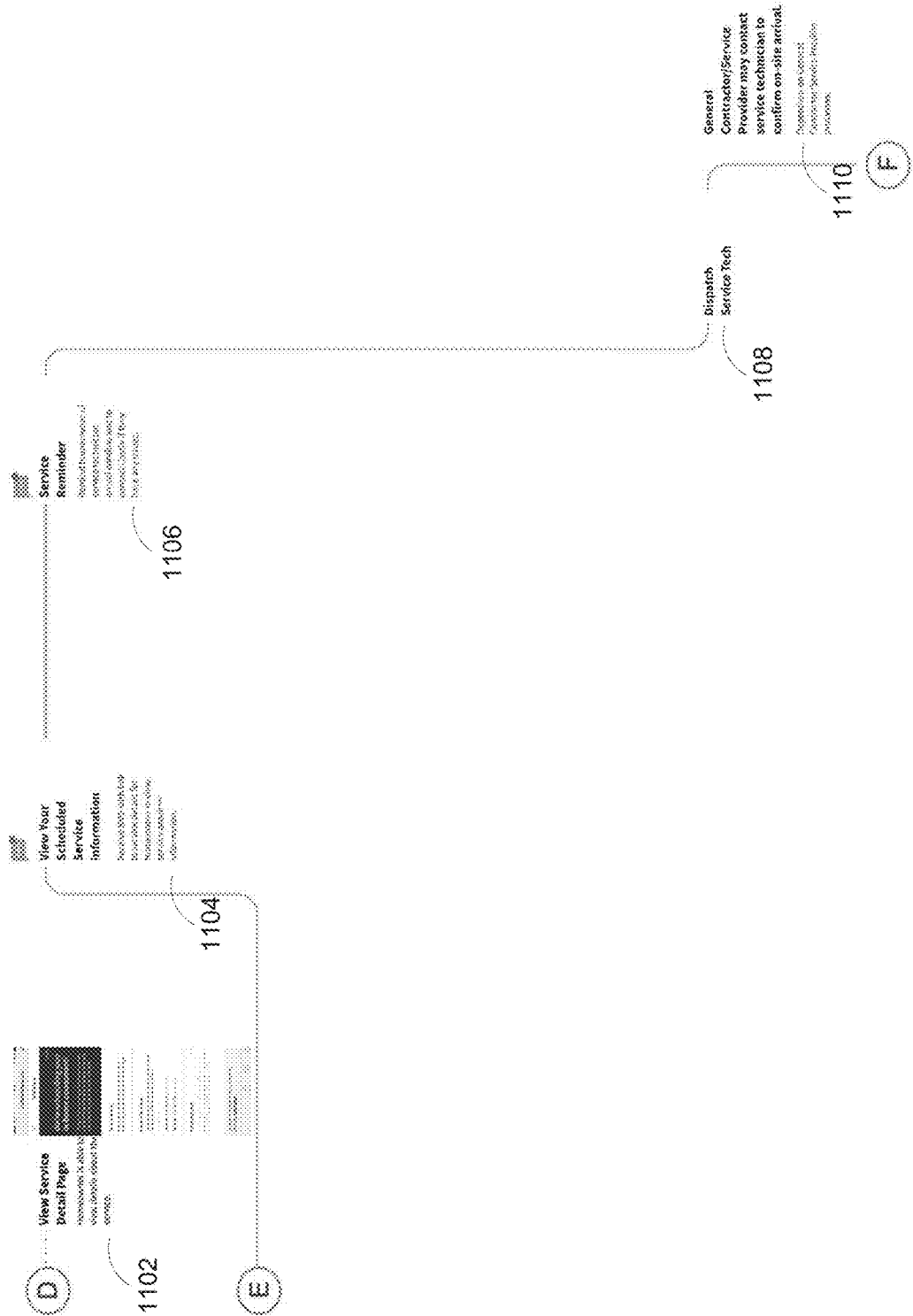

Homeowner registration triggers a welcome text and a user actuated link that includes an address and specifies a communication protocol that is used to access the system at 1002 in FIG. 10. Once connected, the end-user (the homeowner) completes the account set up at 1004 and 1102. If the end-user is not a first-time user and recognized by the system, the system will execute an automated search and identify a screened and vetted service professional. Some identifications are based on location, service type, and ability to meet the homeowner's schedule. Once assigned at 1010, acceptance is made verbally and recorded at 1012, and in some alternate systems is confirmed by an SMS or email message to the contractor and the SP in response to a speech-to-text engine's conversion of the verbal acceptance. At 1010 the system assigns the case to the service professional. Some assignments are made based on a statistical weighting of geographic location, service types, availability to meet the homeowner's schedule, and customer ratings based on an averaged rating factor. Once accepted, acceptance is written to the Castle EP at 1014 and an SMS message is transmitted to the homeowner's device containing the details of the agreement at 1104 in FIG. 11. If service is scheduled a predetermined amount of time in advance, a reminder is automatically sent to and/or automatically generated by the homeowner's device at predetermined intervals at 1106, the service technician is dispatched at 1108, and arrivals at the designated location are confirmed at 1110.

Figure 12:
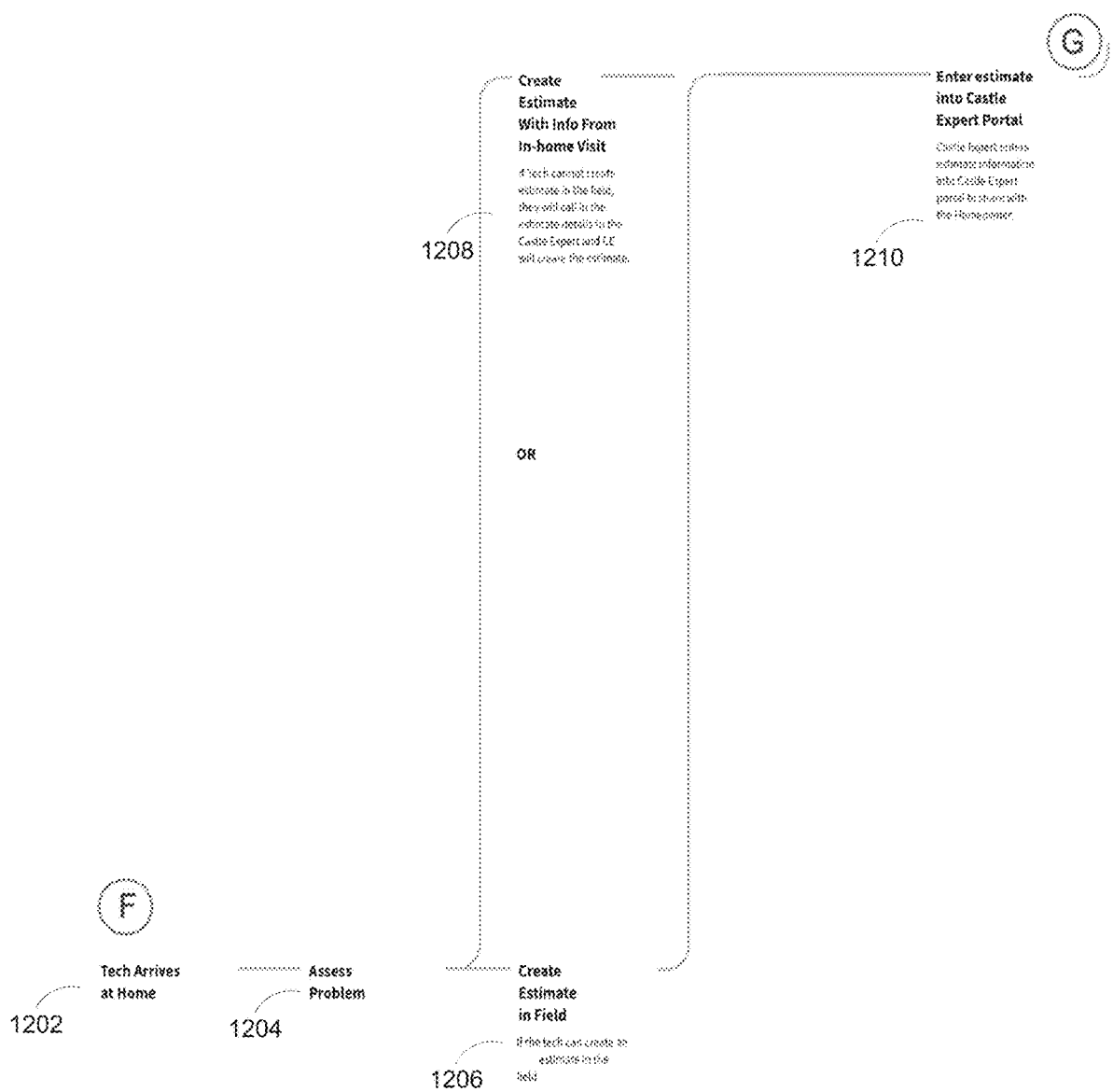
Figure 13:
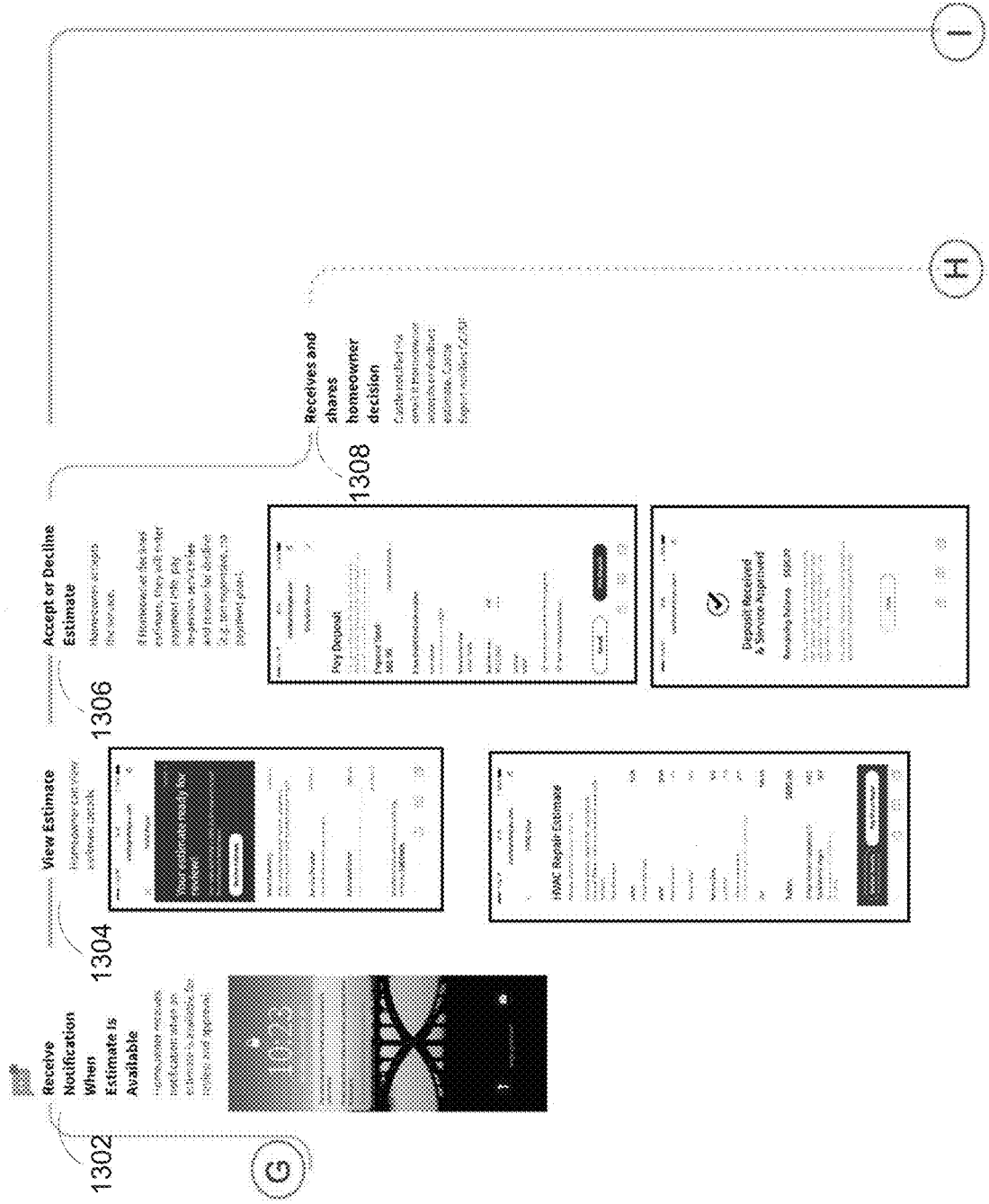
Figure 14:
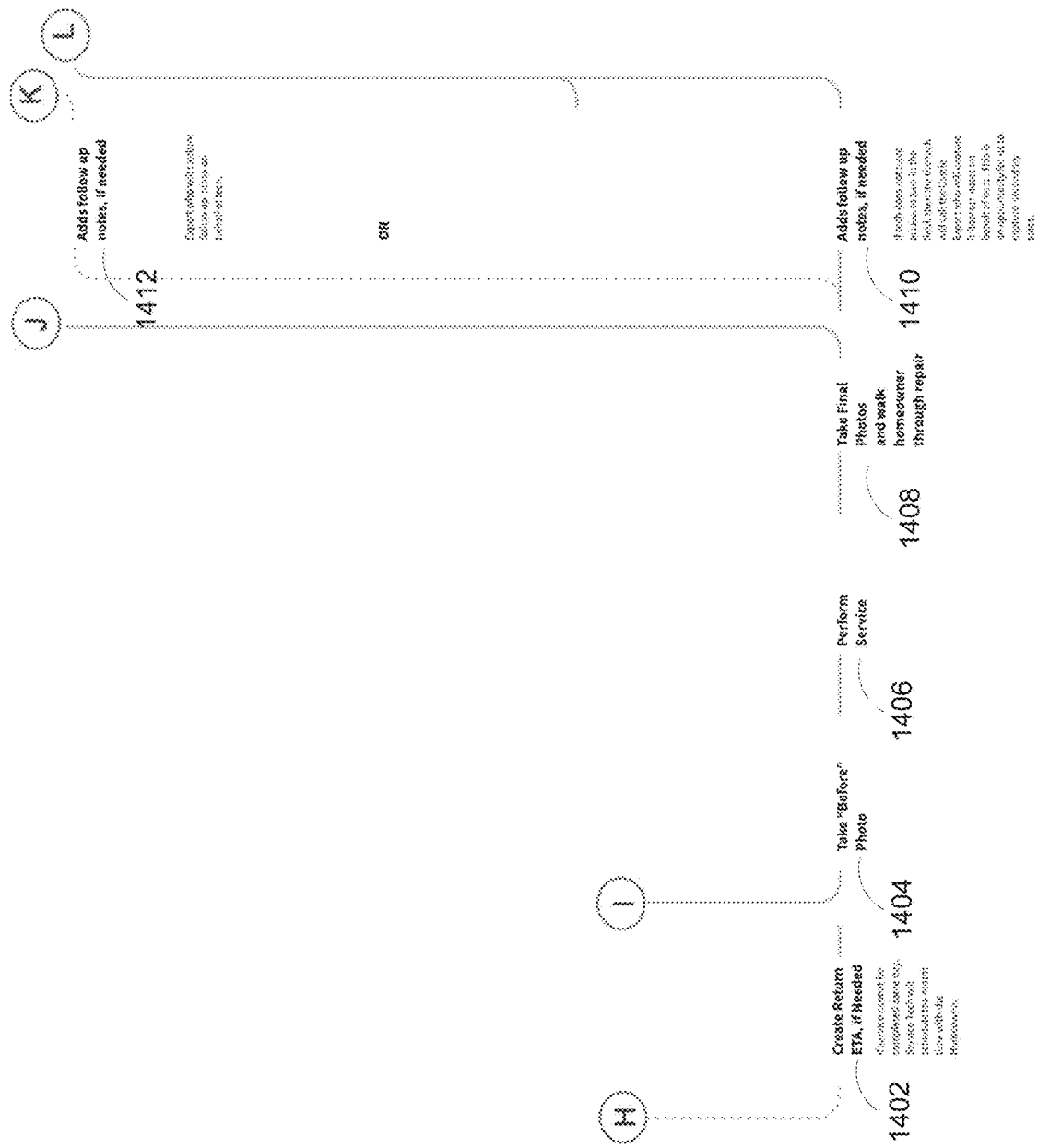
Figure 15:
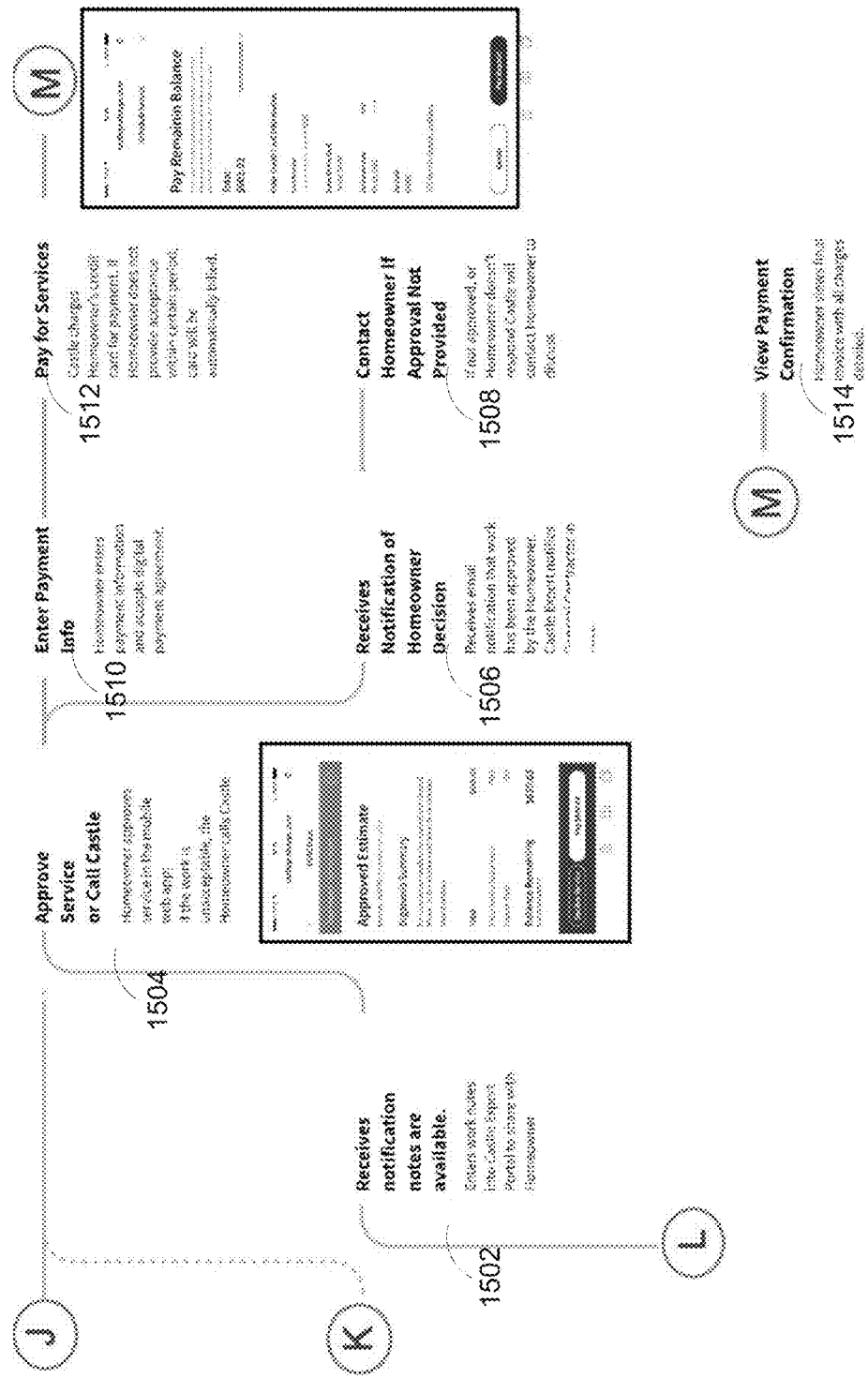

The SP technician arrives at the location and assesses the issue and generates an estimate in the field or transmits the details to the CE that automatically generates the estimate that is entered in the CE portal at 1202-1210 in FIG. 12. At 1302-1308 the homeowner's device receives and the homeowner reviews the estimate and either accepts or declines the estimate via their device (e.g., electronically), which is shared with the service provider in FIG. 13. Notification notes are shared with the homeowner at 1402 in FIG. 14. If the estimate is accepted, approval is made through the mobile app. Before the work is commenced, pictures are taken and uploaded to the system. Once work begins, it continues until the project is completed, and if further work is need, additional time is further scheduled until the project is completed at 1402-1406. Once the project is completed, the completed repairs are explained to the homeowner, final pictures of the completed project are taken, and notes are added that are uploaded to the resource management system that can be shared with the homeowner via their device at 1408-1412 and 1502 as shown in FIGS. 14 and 15. In some systems, project completion triggers a status notification to the homeowner that the contracted service(s) are completed. The completion time is transmitted to the CE through the CMT. If work is approved by the homeowner via their device, the homeowner enters the payment information and the service is charged and confirmed at 1506, 1510-1514. If not approved, the issue is mediated at 1508.

To access sites that render recommendations in the systems described above, connections are made that normally require connections to be formed between remote external resources and local interfaces. For each data object requested, interfaces send requests and in return receive responses from remote external resources, especially when SP and SPT's are identified. When content includes pictures, in addition to downloading textual resources, known interfaces download many images—some of them large. Establishing network connections for each request/response can waste network bandwidth and cause delays, as many network packets must be exchanged even before a request is processed.

Rather than requiring the remote management system to access multiple remote external resources on demand when recommendations are needed, some alternate remote management systems render and provide service professional and/or resource referrals from multiple remote resources through an alternate component layer 138 in real-time, near real-time, or after a delay. The term real-time refers to computer systems that update and process information at the same rate as they receive data, enabling them to direct or control a process, much like an automatic pilot. The alternate component layer 138 downloads data and content and intercepts links to and between the remote data elements, such as words, symbols, and images and other documents, and transparently maps those links to redirected links associated with nearly identical data in the centralized RSM database 120. The redirected links are generated by the component layer 104. The redirected links provide new addresses to the element originally linked to remote objects and the protocol that may be used to access them centrally in the RSM database 120. The new addresses for the resources specify the new source and/or destination that reside locally in a backend cache and/or backend proxy, which may be stored and served by the local RSM database 120 that resides in a cloud storage 140; or in alternate systems, stored in a local document management platform. By redirecting the link and/or generating new links, the resource management system can provide recommendations, relay SPT assignments, and deliver harvested content from its own local cache, local server proxy, and/or turnkey software applications. The systems are not subject to the delays and latencies that come with requests to remote sources served by outside networks. These processes, in turn, reduce the load on the external remote resources and network bandwidth consumption. By serving content locally and centrally, content rendering speeds up dramatically.

Figure 16:
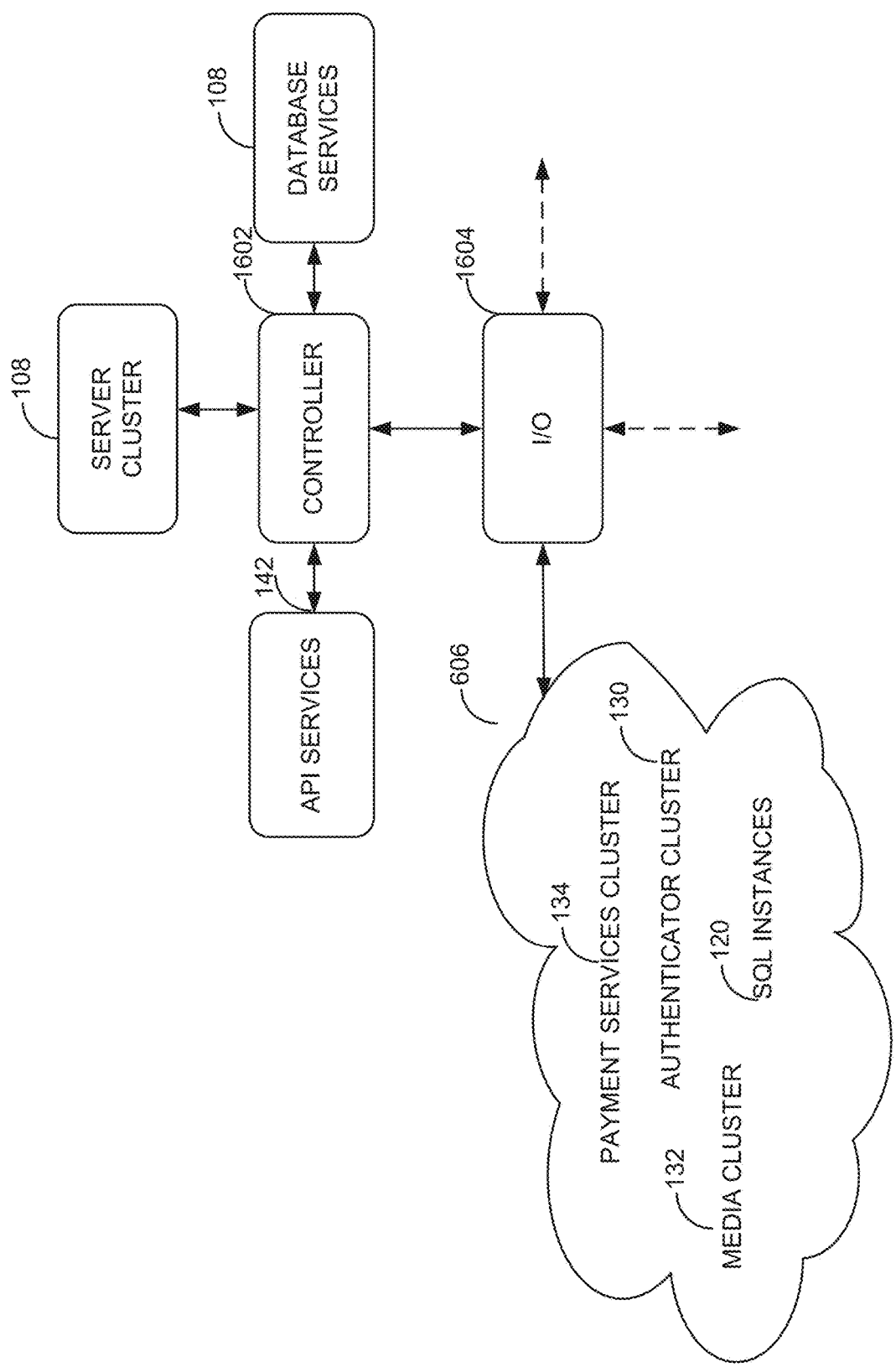
FIG. 16 is an alternate system diagram of a resource management system.

FIG. 16 is a block diagram of the automated resource management system that may comprise the systems shown in FIGS. 1 and 2, and executes the process flows described above and those shown in FIGS. 3-15. In FIG. 16, the controller 1602 interfaces the server cluster 108, API services 142, and database services 120, through an input/output device 1604. The SQL database 120 may be distributed over several computers or maybe a unitary depository residing in cloud storage as shown. The database 120 may include several databases or database instances, and information from multiple sources types; and stores the data in a variety of different formats. The controller 1602 interfaces the payment services cluster 134, authenticator cluster 130, media cluster 132 and SQL instances 120. Some SQL instances 120 apply transformation functions (e.g., correlations functions, linear classification functions that normalize by feature, etc.) to generate surrogates for missing values and outliers, and perform data validations (e.g., via comparisons to acceptable data ranges) to reduce distortions in the stored data.

Figure 17:
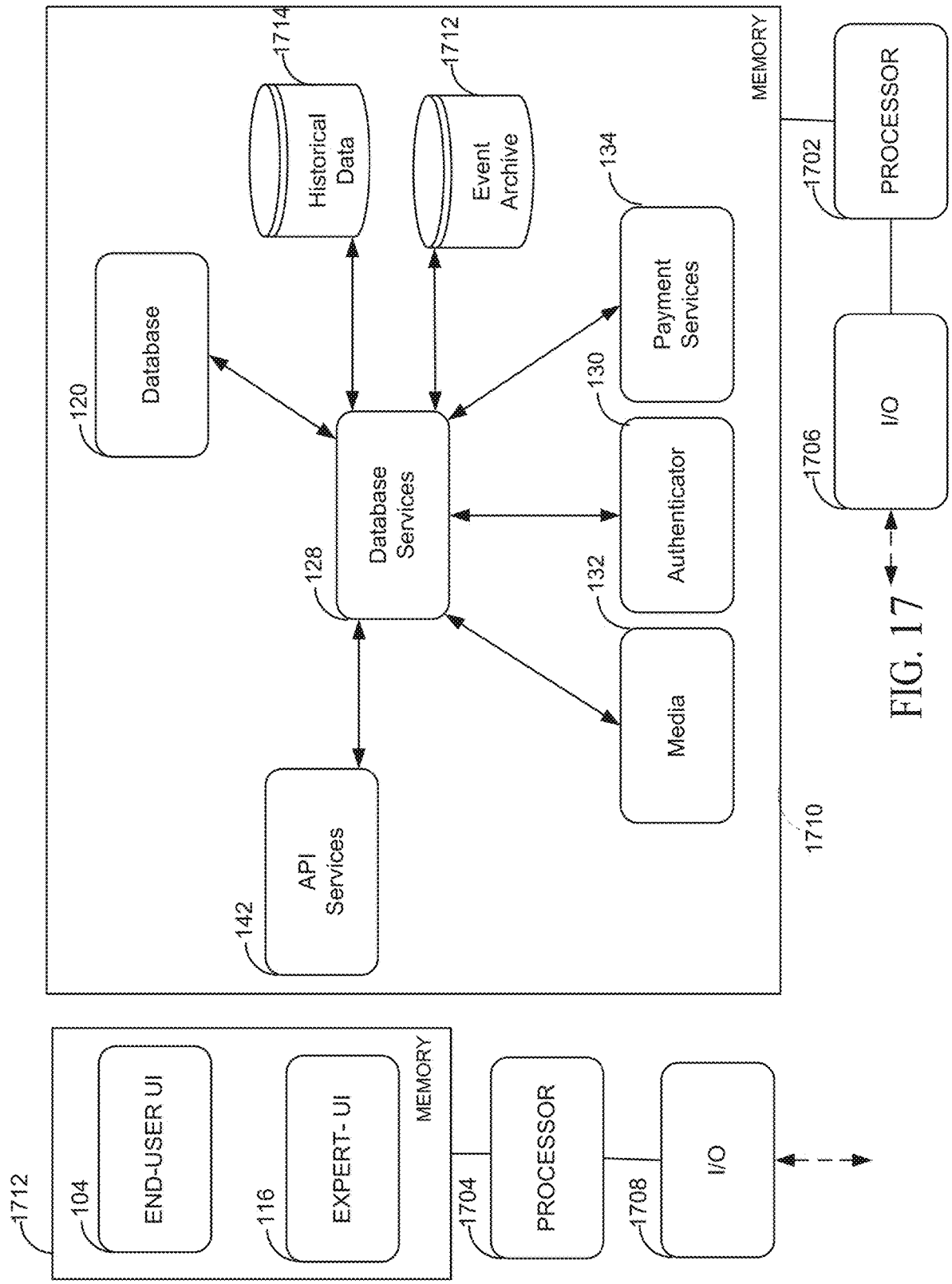
FIG. 17 is a second alternate system diagram of a resource management system.

FIG. 17 is a block diagram of an alternate automated predictive system that may represent the systems shown in FIGS. 1, 2 and 16, and executes the process flows and characteristics described above and those shown in FIGS. 3-15. The system comprises processors 1702 and 1704 and a non-transitory media, such as a non-volatile memory (the contents of which are accessible by either of the processors). The I/O interface 1706 and 1708 connects devices and local and/or remote applications, such as, for example, additional local and/or remote monitored devices. The memory 1710 and 1712 stores instructions, which, when executed by either of the processors 1702 and 1704, causes the resource management system to render some or all of the functionality associated with managing resources as described herein, such as a device the provides home repair services, for example. The memory 1710 stores instructions, which, when executed by the processor 1702, causes the automated resource management system to render functionality associated with the server cluster 108, API server/cluster 142, media server/cluster 132, authenticator server/cluster 130, the payment services server/cluster 134, an event archive 1712, a historical database 1714, and the RSM database 120. The databases 120, 1712, and 1714 may be distributed over several computers, or may be a unitary depository or a cloud storage 140. The database 120 may include several databases and information from multiple sources types, and stores the data in a variety of different formats. The memory 1712 stores instructions, which, when executed by the processor 1704, causes the automated resource management system to render functionality associated with the end-user-UI 104 and the expert-UI 116.

In yet another alternate automated resource management system, the non-transitory media provided functionality is provided entirely through cloud storage and services 140. In this automated predictive system, cloud storage and services 140 provides ubiquitous access to the automated resource management system's resources and higher-level services that can be rapidly provisioned over one or more networks. Cloud storage allows for the sharing of resources to achieve coherence services across many devices at many locations, and provides economies of scale.

The memory and/or storage disclosed 1710 and 1712 may retain an ordered listing of executable instructions for implementing the functions described above in a non-transitory computer code. The machine-readable medium may selectively be, but not limited to, an electronic, magnetic, optical, electromagnetic, infrared, or semiconductor medium. A non-exhaustive list of examples of a machine-readable medium includes: a portable magnetic or optical disk; a volatile memory, such as a Random Access Memory (RAM); a Read-Only Memory (ROM); an Erasable Programmable Read-Only Memory (EPROM or Flash memory); or a database management system. The memory 1710 and 1712 may comprise a single device or multiple devices that may be disposed on one or more dedicated memory devices, or disposed on a processor or other similar device. An "engine" comprises a processor or a portion of a program executed by the processor that automatically executes or supports the procuring, furnishing, and delivering of resources through a self-service portal. It describes a special-purpose program that use models and/or deep learning algorithms to query big data and deliver resources. Big data describes large volumes of data—both structured and unstructured—that inundates a conventional resource management systems on a day-to-day basis. When functions, steps, etc., are said to be "responsive to" or occur "in response to" another function or step, etc., the functions or steps necessarily occur as a result of another function or step, etc. It is not sufficient that a function or act merely follow or occur subsequent to another.

The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the elements disclosed herein and/or shown in FIGS. 1-19).

Resource management systems provide rich visualizations of projects. The systems streamline processes across selections, procurement, service, and finance, using intelligent caching and proxies that simplify managing remote resources and large data. The systems generate graphically rich interactive screens that dynamically render project information over time while guaranteeing cost commitments through invisible mappings. The mappings establish associations between resource addresses for remote sources and remote destinations to local sources through intelligent caches and proxies. The invisible mappings re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and mobile apps by the system's knowledge of its users. When access is granted, end-users coordinate services, enter observations, request assessments, establish analytics, track outcomes, quality, and receive guaranteed satisfaction.

To access objects that render content, connections are usually made between remote resources and local interfaces via remote requests and responses. Establishing network connections for each request/response for materials and services wastes network bandwidth and causes delay as many data exchanges must occur before a request can be serviced. Further when content must be collected from multiple remote resources, some resources include deep link pointers that contain the memory location (address) of embedded content that may be served outside of the network domain. Some linked content is served by remote resources that redirects the user from the user's local environment to compromised external environments not served by the intended-origin server and/or network.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that manages remote and local data comprising:
   a declarative client for retrieving data, tracking data loading, and caching data in response to a transmission of auto-generated queries from an end-user interface;
   the declarative client sitting on an immutable image served by web services of a secure private cloud platform;
   a serverless compute engine that receives the immutable image as a template in which a secure container is built and a plurality of tasks that process the immutable image within the secure container;
   an application programming interface that comprises software executed by the declarative client to extract data in response to the auto-generated queries from the end-user interactive; and
   wherein the declarative client includes a normalized in-memory cache that break up results of the auto-generated queries into individual objects that are each associated with a unique identifier across different directories and a unique name within a local cache to speed up the execution of the auto-generated queries;

wherein the extracted data comprises data extracted from deconstructed downloaded content in which original computer links between data elements are intercepted and mapped to redirected computer links that locate the downloaded content within a local centralized database.

2. The system of claim 1 further comprising an autogenerated query builder formed by a query generator.

3. The system of claim 2 where the query builder is based on a plurality of application models and a plurality of auto-generated queries comprise a GraphQL service.

4. The system of claim 1 further comprising a software layer that optimizes a voice messaging service, a video messaging service, and a textual messaging servicing.

5. The system of claim 1 further comprising a payment platform remote from the declarative client and the application programming interface that communicates directly with the interface and the application programming interface and pushes a token to the interface and the application programming interface from which payment is drawn against.

6. The system of claim 1 further comprising authentication and authorization servers that generate user pools that configure accessibility rights to the remote and local data.

7. The system of claim 6 where the authentication and authorization servers render a two-way authentication that comprises global positioning data processed by an end-user's device.

8. The system of claim 1 where the extracted data comprises a referral of a service professional.

9. The system of claim 1 where acceptance of a referral of a service professional occurs electronically through an end-user's mobile device and a Web application.

10. The system of claim 1 where acceptance of a quote from a service professional is based on a shared cryptographic secret stored on the system and on an end-user's device.

11. A non-transitory computer-readable storage medium having stored thereon a plurality of software instructions that, when executed by a hardware processor, causes:

retrieving data and caching data in response to a transmission of queries from an end-user interface via a declarative client;

the declarative client sitting on an immutable image served by web services of a secure cloud platform;

receiving via a serverless compute engine the immutable image as a template in which a secure container is built and a plurality of tasks that process the immutable image within the secure container; and extracting data in response to the queries from the end user interface via an application programming interface that comprises a software executed by the declarative client;

wherein the declarative client includes a normalized in-memory cache that breaks up results of the queries into individual objects, and are stored individually in a memory and that are each associated with a unique identifier across different directories and a unique name within a local cache to speed up the execution of database queries;

wherein the extracted data comprises data extracted from deconstructed downloaded content in which original computer assigned links between data elements are intercepted and mapped automatically to redirected computer links that locate the downloaded content within a local centralized database.

12. The non-transitory computer-readable medium of claim 11 further comprising an autogenerated query builder generated by a query generator.

13. The non-transitory computer-readable medium of claim 12 where the query builder is based on a plurality of application models and a plurality of auto-generated queries comprise a GraphQL service.

14. The non-transitory computer-readable medium of claim 11 further comprising a optimizing a voice messaging service, a video messaging service, and a textual messaging servicing that is directly linked to an end-user.

15. The non-transitory computer-readable medium of claim 11 further comprising pushing a nonreducible token to the interface and the application programming interface from which a payment is drawn against.

16. The non-transitory computer-readable medium of claim 11 further comprising generating user pools that configure accessibility rights to a remote data and a local data via authentication and authorization servers.

17. The non-transitory computer-readable medium of claim 16 where the authentication and authorization servers render a two-way authentication comprising global positioning data rendered by an end-user's device.

18. The non-transitory computer-readable medium of claim 11 where the extracted data comprises a referral of a service professional.

19. The non-transitory computer-readable medium of claim 11 where an acceptance of a referral of a service professional occurs only electronically through an end-user's mobile device.

20. The non-transitory computer-readable medium of claim 11 where an acceptance of a quote from a service professional is based on a shared cryptographic secret stored on the non-transitory computer-readable medium and on an end-user's device.

* * * * *